United States Patent
Goel et al.

(10) Patent No.: US 10,977,324 B2
(45) Date of Patent: Apr. 13, 2021

(54) PERSONAL CONTENT ITEM SEARCHING SYSTEM AND METHOD

(71) Applicant: Dropbox, Inc., San Francisco, CA (US)

(72) Inventors: Samir Goel, San Francisco, CA (US); Franck Chastagnol, Woodside, CA (US); Abhishek Agrawal, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 189 days.

(21) Appl. No.: 15/905,590

(22) Filed: Feb. 26, 2018

(65) Prior Publication Data

US 2018/0181670 A1 Jun. 28, 2018

Related U.S. Application Data

(63) Continuation of application No. 14/856,295, filed on Sep. 16, 2015, now Pat. No. 9,959,357, which is a (Continued)

(51) Int. Cl.
*G06F 16/22* (2019.01)
*G06F 16/9535* (2019.01)
(Continued)

(52) U.S. Cl.
CPC ......... *G06F 16/9535* (2019.01); *G06F 16/22* (2019.01); *G06F 16/2228* (2019.01);
(Continued)

(58) Field of Classification Search
CPC ............... G06F 16/2228; G06F 16/319; G06F 16/2329; G06F 16/31; G06F 16/182;
(Continued)

(56) References Cited

U.S. PATENT DOCUMENTS 6,067,541 A 5/2000 Raju
6,151,643 A 11/2000 Cheng
(Continued)

FOREIGN PATENT DOCUMENTS

CA 2421825 A1 3/2004
CA 2637218 A1 6/2008
(Continued)

OTHER PUBLICATIONS

Extended European Search Report for EP Application 16152761.9 dated Apr. 28, 2016, 3 pages.
(Continued)

*Primary Examiner* — Marcin R Filipczyk
(74) *Attorney, Agent, or Firm* — Hickman Becker Bingham Ledesma LLP; Adam C. Stone

(57) ABSTRACT

Enable using a user computer to search the user's personal content items hosted by an online content management service, the online content management service having an indexer computer configured to generate a base index of the user's content items hosted by the service, a base index server computer configured to transmit the generated base index over a network to the user computer, an index mutation generator computer configured to generate index mutations for subsequent changes to user's hosted content items, and an index mutation sever computer configured to transmit the generated index mutations over the network to the user computer. In one aspect, the system and method enable searches of the user's hosted content items and changes thereto to be conducted at the user computer using an index local to the user computer constructed based on the base index and the index mutations received by the user computer.

20 Claims, 12 Drawing Sheets

Related U.S. Application Data continuation of application No. 14/609,930, filed on Jan. 30, 2015, now Pat. No. 9,183,303.

(51) Int. Cl.

| | | |
|---|---|---|
| *H04L 29/08* | (2006.01) | |
| *G06F 16/951* | (2019.01) | |
| *G06F 16/957* | (2019.01) | |
| *G06F 16/31* | (2019.01) | |
| *G06F 16/23* | (2019.01) | |
| *G06F 16/248* | (2019.01) | |

(52) U.S. Cl.
CPC .......... *G06F 16/23* (2019.01); *G06F 16/319* (2019.01); *G06F 16/951* (2019.01); *G06F 16/957* (2019.01); *H04L 67/10* (2013.01); *G06F 16/2329* (2019.01); *G06F 16/248* (2019.01); *H04L 67/1095* (2013.01)

(58) Field of Classification Search
CPC ...... G06F 16/248; G06F 16/951; G06F 21/62; G06F 16/22; G06F 16/23
USPC ......................................................... 707/711
See application file for complete search history.

(56) References Cited

U.S. PATENT DOCUMENTS

| | | | |
|---|---|---|---|
| 6,389,412 B1 | 5/2002 | Light | |
| 6,510,439 B1 | 1/2003 | Rangarajan et al. | |
| 6,751,603 B1 | 6/2004 | Bauer et al. | |
| 7,171,404 B2 | 1/2007 | Lindblad et al. | |
| 7,194,487 B1 | 3/2007 | Kekre | |
| 7,437,353 B2 | 10/2008 | Marmaros et al. | |
| 7,508,419 B2 | 3/2009 | Toyama et al. | |
| 7,634,517 B1 | 12/2009 | Burrows et al. | |
| 7,693,813 B1 | 4/2010 | Cao | |
| 7,702,614 B1 | 4/2010 | Shah | |
| 8,005,919 B2 | 8/2011 | Mehanna | |
| 8,126,895 B2* | 2/2012 | Sargent .................. G06F 16/31 | |
| | | | 707/741 |
| 8,510,657 B2 | 8/2013 | Gilbert et al. | |
| 8,620,923 B1 | 12/2013 | Wormley | |
| 8,682,901 B1 | 3/2014 | Cao | |
| 8,707,451 B2* | 4/2014 | Ture .................... G06F 21/6218 | |
| | | | 726/28 |
| 8,756,215 B2 | 6/2014 | Shikha | |
| 8,825,602 B1 | 9/2014 | Desai | |
| 8,868,677 B2 | 10/2014 | Molaro et al. | |
| 9,542,391 B1 | 1/2017 | Eisner et al. | |
| 9,984,110 B2 | 5/2018 | Goel et al. | |
| 2002/0078134 A1 | 6/2002 | Stone | |
| 2004/0064512 A1 | 4/2004 | Arora | |
| 2004/0064568 A1 | 4/2004 | Arora | |
| 2004/0070678 A1 | 4/2004 | Toyama | |
| 2004/0078370 A1 | 4/2004 | Acree | |
| 2004/0083091 A1 | 4/2004 | Le et al. | |
| 2004/0225963 A1 | 11/2004 | Agarwal | |
| 2004/0230903 A1 | 11/2004 | Elza | |
| 2005/0028082 A1 | 2/2005 | Topalov et al. | |
| 2005/0055364 A1 | 3/2005 | Frieder | |
| 2005/0165838 A1 | 7/2005 | Fontoura | |
| 2006/0031198 A1 | 2/2006 | Newbold et al. | |
| 2006/0053157 A1 | 3/2006 | Pitts et al. | |
| 2007/0043750 A1 | 2/2007 | Dingle | |
| 2007/0055926 A1 | 3/2007 | Christiansen et al. | |
| 2007/0067726 A1 | 3/2007 | Flynt et al. | |
| 2008/0005184 A1 | 1/2008 | Myllyla et al. | |
| 2008/0243788 A1 | 10/2008 | Reztlaff et al. | |
| 2008/0243828 A1 | 10/2008 | Reztlaff et al. | |
| 2008/0243958 A1 | 10/2008 | Prahlad et al. | |
| 2008/0250021 A1 | 10/2008 | Boys et al. | |
| 2008/0271156 A1 | 10/2008 | Lipinski | |
| 2008/0294674 A1 | 11/2008 | Reztlaff et al. | |
| 2008/0313198 A1 | 12/2008 | Kim et al. | |
| 2009/0019548 A1 | 1/2009 | Reid | |
| 2009/0063448 A1 | 3/2009 | Depue et al. | |
| 2009/0083268 A1 | 3/2009 | Coqueret | |
| 2009/0089323 A1 | 4/2009 | Yoshihama | |
| 2009/0097651 A1 | 4/2009 | Whillock | |
| 2009/0164437 A1 | 6/2009 | Torbjornsen | |
| 2009/0228528 A1 | 9/2009 | Ercegovac et al. | |
| 2009/0274158 A1 | 11/2009 | Sharp | |
| 2009/0276401 A1 | 11/2009 | Groble et al. | |
| 2009/0276455 A1 | 11/2009 | Yu et al. | |
| 2009/0313503 A1 | 12/2009 | Atluri | |
| 2010/0161617 A1 | 6/2010 | Cao et al. | |
| 2010/0174709 A1 | 7/2010 | Hansen et al. | |
| 2010/0306191 A1 | 12/2010 | Lebeau et al. | |
| 2011/0029504 A1 | 2/2011 | King | |
| 2011/0078243 A1 | 3/2011 | Carpenter et al. | |
| 2011/0191767 A1 | 8/2011 | Pinsky | |
| 2011/0202541 A1* | 8/2011 | Permandla .............. G06F 16/31 | |
| | | | 707/742 |
| 2011/0225627 A1 | 9/2011 | Uchida et al. | |
| 2011/0246475 A1 | 10/2011 | Shelton | |
| 2011/0258198 A1 | 10/2011 | Sun et al. | |
| 2012/0131009 A1 | 5/2012 | Nath et al. | |
| 2012/0150796 A1 | 6/2012 | Martick | |
| 2012/0150864 A1 | 6/2012 | Palakodety | |
| 2012/0158689 A1 | 6/2012 | Doshi et al. | |
| 2012/0215785 A1 | 8/2012 | Singh | |
| 2012/0233209 A1 | 9/2012 | Cheng et al. | |
| 2012/0331568 A1 | 12/2012 | Weinstein et al. | |
| 2013/0018916 A1 | 1/2013 | Busch | |
| 2013/0080912 A1 | 3/2013 | Job et al. | |
| 2013/0124467 A1 | 5/2013 | Naidu et al. | |
| 2013/0138658 A1 | 5/2013 | Flick | |
| 2013/0185439 A1 | 7/2013 | Velasco | |
| 2013/0191414 A1 | 7/2013 | Srivastava et al. | |
| 2013/0226871 A1 | 8/2013 | Sarnowski | |
| 2013/0275548 A1 | 10/2013 | Molaro et al. | |
| 2013/0332575 A1 | 12/2013 | Song | |
| 2014/0019405 A1 | 1/2014 | Borthakur et al. | |
| 2014/0032703 A1 | 1/2014 | Wormley | |
| 2014/0047349 A1 | 2/2014 | Kulkarni et al. | |
| 2014/0058732 A1 | 2/2014 | Labsky | |
| 2014/0081201 A1 | 3/2014 | Doshi et al. | |
| 2014/0095467 A1 | 4/2014 | Bueche | |
| 2014/0129712 A1 | 5/2014 | Sharp | |
| 2014/0136543 A1 | 5/2014 | Frieden et al. | |
| 2014/0149401 A1 | 5/2014 | Liu et al. | |
| 2014/0156669 A1 | 6/2014 | Bati | |
| 2014/0229426 A1 | 8/2014 | Gootee | |
| 2014/0304618 A1 | 10/2014 | Carriero et al. | |
| 2014/0379661 A1 | 12/2014 | Marcus Nyman et al. | |
| 2015/0026153 A1 | 1/2015 | Gupta et al. | |
| 2015/0112996 A1 | 4/2015 | Mishra | |
| 2015/0193399 A1 | 7/2015 | Woker | |
| 2015/0281401 A1 | 10/2015 | Le | |
| 2016/0055188 A1 | 2/2016 | Goel et al. | |
| 2016/0224677 A1 | 8/2016 | Goel | |
| 2016/0275197 A1 | 9/2016 | Goel et al. | |
| 2017/0011084 A1 | 1/2017 | Goel | |
| 2017/0102852 A1 | 4/2017 | Agrawal et al. | |

FOREIGN PATENT DOCUMENTS

| | | |
|---|---|---|
| CN | 1755677 A | 4/2006 |
| CN | 102567489 A | 7/2012 |
| CN | 103597474 A | 2/2014 |
| JP | H07334406 A | 12/1995 |
| JP | 2002149970 A | 5/2002 |
| JP | 2003162441 A | 6/2003 |
| JP | 2003162449 A | 6/2003 |
| JP | 2003337819 A | 11/2003 |
| JP | 2004164555 A | 6/2004 |
| JP | 2006185368 A | 7/2006 |
| JP | 2007122371 A | 5/2007 |
| JP | 2010505187 A | 2/2010 |
| JP | 2010522936 A | 7/2010 |
| JP | 2010537324 A | 12/2010 |
| JP | 2010538366 A | 12/2010 |

(56) References Cited

FOREIGN PATENT DOCUMENTS

| JP | 2012530292 A | 11/2012 |
|---|---|---|
| KR | 10-2004-0039691 | 5/2004 |
| KR | 10-2004-0077918 | 9/2004 |
| KR | 10-2006-0116042 | 11/2006 |
| KR | 10-2007-0051569 | 5/2007 |
| WO | WO 03/079270 A1 | 9/2003 |
| WO | WO2005/114470 A1 | 12/2005 |
| WO | 2012095973 A1 | 7/2012 |
| WO | 2013147785 A1 | 10/2013 |
| WO | 2014010082 A1 | 1/2014 |
| WO | WO2014/133495 A1 | 9/2014 |

OTHER PUBLICATIONS

Co-pending U.S. Appl. No. 14/609,937, filed Jan. 30, 2015, 64 pages.
Co-pending U.S. Appl. No. 14/609,919, filed Jan. 30, 2015, 39 pages.
"Subversion Book—CollabNet Community Chapter 2 Basic Usage", Jun. 19, 2013, retrieved from the URL: https://web.archive.org/web/20130619235633, on Mar. 23, 2016, 4 pages.
Parker-Wood et al., "Security Aware Partitioning for Efficient File System Search", IEEE, dated 2010, Mass Storage Technologies, 14 pages.
Korean Patent Office, "Search Report" in application No. 10-2017-7004799, dated May 15, 2017, 3 pages.
International Searching Authority, "Search Report" in application No. PCT/US2016/015575, dated May 10, 2016, 11 pages.
International Searching Authority, "Search Report" in application No. PCT/US2015/030476, dated Aug. 19, 2015, 11 pages.
International Searching Authority, "Search Report" in application No. PCT/US2015/030474, dated Aug. 19, 2015, 8 pages.
European Patent Office, "Search Report" in application No. PCT/US2015/030474, dated Nov. 20, 2015, 21 pages.
European Claims in application No. PCT/US2015/030476, dated Aug. 2015, 9 pages.
European Claims in application No. PCT/US2015/030474, dated Nov. 2015, 10 pages.
Current Claims in application No. PCT/US2016/015575, dated May 2010, 6 pages.
Concise explanation of the Korean language search report, in application No. 10-2017-7004799, dated Mar. 7, 2017, 1 page.
Claims in Korean Application No. 10-2017-7004799, dated on Mar. 2017, 7 pages.
Claims in application No. PCT/US2015/030476, dated Aug. 2015, 9 pages.
Claims in application No. PCT/US2015/030474, dated Aug. 2015, 10 pages.
Anonymous, "Git Basics—Recording Changes to the Repository," Dec. 30, 2014, XP055570020, retrieved from https://web.archive.org/web/20141230193338/http://gits-cm.com/book/en/v2/Git-Basics-Recording-Changes-to-the-Repository on Mar. 15, 2019, 5 pages.
Anonymous, "Git Tools—Searching," Dec. 24, 2014, XP055569985, retrieved from https://web.archive.org/web/20141224155820/https://git-scm.com/book/en/v2/Git-Tools-Searching on Mar. 15, 2019, 7 pages.
Chacon S., "Pro Git," ISBN: 978-1-43-021833-3, retrieved from http:/Iproquest.safaribooksonline.com/9781430218333, Aug. 2, 2010.
Claims for Korean Application No. 10-2017-7004799 mailed on May 2017, 7 pages.
Communication pursuant to Rule 115(1) EPC for European Application No. 16704989.9, dated May 28, 2020, 11 pages.
Co-pending U.S. Appl. No. 14/609,930, (60332-0048), filed Jan. 30, 2015, 66 pages.
Díaz-Sánchez D., et al., "Media Cloud: An Open Cloud Computing Middleware for Content Management," IEEE Transactions on Consumer Electronics, May 2011, vol. 57(2), pp. 970-978.
Examination Search Report for Canada Application No. 3,009,686 dated Jan. 29, 2020, 3 pages.
Extended European Search Report for EP Application No. 17155084.1 dated May 31, 2017, 4 pages.
Final Office Action from U.S. Appl. No. 15/960,431, dated Apr. 28, 2020, 20 pages.
Final Office Action from U.S. Appl. No. 15/960,432, dated Apr. 28, 2020, 28 pages.
Ichikawa Y., et al., "Distributed Search Engine for an IaaS Based Cloud," International Conference on Broadband and Wireless Computing, Communication and Applications (BWCCA 2011), Oct. 26-28, 2011, pp. 34-39.
LSDS-IR 2010, "Large-Scale Distributed Systems for Information Retrieval 2010," Proceedings of the 8th Workshop on Large-Scale Distributed Systems for Information Retrieval, Jul. 23, 2010, 39 pages.
Non-Final Office Action from U.S. Appl. No. 15/960,431, dated Feb. 13, 2020, 27 pages.
Non-Final Office Action from U.S. Appl. No. 15/960,432, dated Feb. 24, 2020, 31 pages.
Notice of Allowance from U.S. Appl. No. 15/640,121, dated Oct. 3, 2019, 7 pages.
Notice of Allowance for U.S. Appl. No. 14/555,147 dated Feb. 1, 2018, 6 pages.
Notice of Allowance for U.S. Appl. No. 14/555,171 dated Feb. 1, 2018, 6 pages.
Notice of Allowance for U.S. Appl. No. 15/275,238 dated Jul. 20, 2018, 16 pages.
Notification of the First Office Action and Search Report for Chinese Application No. 201580045069.9 dated Sep. 23, 2019, 20 pages.
Office Action for Canada Application No. 2,956,141 dated Dec. 23, 2019, 1 page.
Notice of Allowance from U.S. Appl. No. 15/960,431, dated Apr. 9, 2020, 7 pages.
Notice of Allowance from U.S. Appl. No. 15/960,432, dated Sep. 18, 2020, 7 pages.
U.S. Appl. No. 14/555,140, filed Nov. 26, 2014, Office Action, dated Mar. 18, 2015.
Goel, U.S. Appl. No. 14/555,180, filed Nov. 26, 2014, Notice of Allowance, dated Jun. 15, 2017.
Goel, U.S. Appl. No. 14/856,295, filed Sep. 16, 2015, Final Office Action, dated Dec. 21, 2016.
Goel, U.S. Appl. No. 14/856,295, filed Sep. 16, 2015, Notice of Allowance, dated Dec. 12, 2017.
Goel, U.S. Appl. No. 14/856,295, filed Sep. 16, 2015, Office Action, dated Jun. 30, 2017.
Goel, U.S. Appl. No. 14/856,295, filed Sep. 16, 2015, Advisory Action, dated Feb. 22, 2017.
Goel, U.S. Appl. No. 15/169,437, filed May 31, 2016, Interview Summary, dated Apr. 6, 2017.
Goel, U.S. Appl. No. 15/169,437, filed May 31, 2016, Advisory Action, dated Jul. 17, 2017.
Goel, U.S. Appl. No. 15/169,437, filed May 31, 2016, Appeal Brief, Sep. 29, 2017.
Goel, U.S. Appl. No. 15/169,437, filed May 31, 2016, Final Office Action, dated May 31, 2017.
Goel, U.S. Appl. No. 15/169,437, filed May 31, 2016, Interview Summary, dated Jun. 29, 2017.
Goel, U.S. Appl. No. 15/275,238, filed Sep. 23, 2016, Office Action, dated Nov. 15, 2017.
Goel, U.S. Appl. No. 14/555,147, filed Nov. 26, 2014, Office Action, dated Jul. 13, 2017.
U.S. Appl. No. 14/555,140, filed Nov. 26, 2014, Final Office Action, dated Jul. 7, 2015.
Goel, U.S. Appl. No. 14/555,171, filed Nov. 26, 2014, Office Action, dated Jul. 21, 2017.
U.S. Appl. No. 14/609,937, filed Jan. 30, 2015, Interview Summary, dated Jun. 11, 2015.
U.S. Appl. No. 14/856,295, filed Sep. 16, 2015, Office Action, dated Jul. 15, 2016.
U.S. Appl. No. 14/609,937, filed Jan. 30, 2015, Office Action, dated Nov. 9, 2015.
U.S. Appl. No. 14/609,937, filed Jan. 30, 2015, Office Action, dated Mar. 19, 2015.

(56) References Cited

OTHER PUBLICATIONS

U.S. Appl. No. 14/609,937, filed Jan. 30, 2015, Notice of Allowance, dated Feb. 24, 2016.
U.S. Appl. No. 14/555,140, filed Nov. 26, 2014, Interview Summary, dated Nov. 19, 2015.
U.S. Appl. No. 14/609,937, filed Jan. 30, 2015, Advisory Action, dated Oct. 6, 2015.
U.S. Appl. No. 14/555,140, filed Nov. 26, 2014, Notice of Allowance, dated Jul. 29, 2016.
U.S. Appl. No. 14/609,930, filed Jan. 30, 2015, Office Action, dated Apr. 3, 2015.
U.S. Appl. No. 14/609,930, filed Jan. 30, 2015, Notice of Allowance, dated Jul. 8, 2015.
U.S. Appl. No. 14/555,180, filed Nov. 26, 2014, Office Action, dated Dec. 1, 2016.
U.S. Appl. No. 14/555,140, filed Nov. 26, 2014, Office Action, dated Oct. 1, 2015.
U.S. Appl. No. 14/555,140, filed Nov. 26, 2014, Office Action, dated Mar. 2, 2016.
U.S. Appl. No. 15/169,437, filed May 31, 2016, Office Action, dated Jan. 10, 2017.
U.S. Appl. No. 14/609,937, filed Jan. 30, 2015, Final Office Action, dated Jul. 7, 2015.
Goel, U.S. Appl. No. 15/169,437, filed May 31, 2016, Notice of Allowance, dated Apr. 3, 2019.
Goel, U.S. Appl. No. 15/275,238, filed Sep. 23, 2016, Final Office Action, dated May 15, 2018.
Goel, U.S. Appl. No. 15/169,437, filed May 31, 2016, Decision on Appeal, Jan. 3, 2019.
Goel, U.S. Appl. No. 15/169,437, filed May 31, 2016, Examiners Answers, dated Feb. 2, 2018.
Notice of Decision to refuse a European Patent application No. 16704989.9, dated Jan. 11, 2021, 23 pages.
Provision of the the minutes in accordance with Rule 124(4) EPC for European application No. 16704989.9, dated Dec. 21, 2020, 13 pages.

\* cited by examiner

US 10,977,324 B2

PERSONAL CONTENT ITEM SEARCHING SYSTEM AND METHOD

CROSS-REFERENCE TO RELATED APPLICATIONS

The present application is a continuation of U.S. patent application Ser. No. 14/856,295 filed Sep. 16, 2015; which is a continuation of Ser. No. 14/609,930 filed Jan. 30, 2015, now U.S. Pat. No. 9,183,303 issued Nov. 10, 2015, the entire content of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The invention is generally directed to a personal content item searching system and method. More specifically, embodiments of the invention are directed to a personal content item searching system and method that, by locally indexing a user's personal content items hosted by an online content management service at the user's user computer, allows the user to use the user computer to search the user's hosted content items.

BACKGROUND

Computers are very powerful tools for searching for relevant information among a vast amount of information. Indexes are a common mechanism for efficiently identifying information of interest among a large corpus of information using a computer. A typical index is an organized mapping of keywords to the documents of information from which the keywords were extracted. As an example, an index of the world's publically accessible web pages may map words in the web pages to the subset of the web pages that contain that word.

Between the actual physical index itself (e.g., the index data as stored on one or more computers) and the users of the system, a search system is typically provided as a software cushion or layer. In essence, the search system shields the user from knowing or even caring about underlying index details. Typically, all requests from users for information in the index are processed by the search system. For example, documents relevant to a user's request for information may be identified by the search system using an index, all without user knowledge of the underlying index implementation. In this manner, the search system provides users quick access to relevant information without concern to how the information is indexed. One well-known search system for identifying relevant information among the world's publically accessible web pages is the GOOGLE Internet search engine provided by Google Inc. of Mountain View, Calif.

One function of a search system is to answer search queries (or just "queries" for short). A query may be defined as a logical expression including a set of one or more search terms, and results in the identification of a subset of indexed documents. Consider, for instance, the handling of a request for information from an Internet search engine. In operation, this request is typically issued by a client system as one or more Hyper Text Transfer Protocol ("HTTP") requests for retrieving particular search results from indexes on server computers. For example, a request may be for a list of Internet web pages containing the words "college" and "basketball." In response to this request, the search system typically returns a web page containing hyperlinks to those Internet web pages considered to be most relevant to the search terms "college" and "basketball."

Internet search engines are well-suited for searching all the world's information that is publically available on the Internet. Recently, however, users are beginning to amass a substantial amount of personal digital information that is not publically accessible on the Internet or indexed by an Internet search engine. Such information can include, for example, personal digital photos, school, and work documents among other personal and private digital information. In some instances, a user's personal digital information is shared with a specified group of users. For example, an employee may share work documents with other colleagues or a user may share digital photos with friends and family.

One way users have recently begun storing and managing all their personal digital information is by using an online content management service. Such services allow users to use their user computers to upload and store their personal digital information on the service's server computers accessible through the Internet or other communication networks. One well-known online content management service is DROPBOX provided by Dropbox, Inc. of San Francisco, Calif.

Users of online content management services would appreciate ways to search for and locate their personal digital information hosted by such services. Such personal digital information is typically not publically accessible on the Internet. For this and other reasons, Internet search engines are generally not adequate to meet the search needs of these users.

SUMMARY OF THE DISCLOSURE

Various embodiments of the system and method enable a user to use a user computer to search the user's personal content items hosted by an online content management service, the online content management service having an indexer computer configured to generate a base index of the user's hosted content items, an index server computer configured to serve the generated base index to the user computer, an index mutation generator computer configured to generate index mutations reflecting changes made to the user's hosted content items, and an index mutation server computer configured to serve the generated index mutations to the user computer. In an embodiment of the invention, an index mutation includes one or more index tokens to use to index a hosted content item and/or one or more index tokens to not use to index a hosted content item.

A feature of some embodiments of the personal content item searching system is that searches of the user's hosted content items and changes thereto are conducted at the user computer using a local index at the user computer constructed based on the base index and the index mutations received by the user computer. An advantage of this feature is that the user can search the user's hosted content items and changes thereto even if the user computer is not connected to the online content management service at the time of the search. Another advantage of this feature is that an answer to the user's search query can be provided to the user more quickly because the local index allows the answer to be identified and provided to the user without having to send the search query over a communications network.

Another feature of some embodiments of the personal content item searching system is that the base index is generated by the online content management service. An advantage of this feature is that processing cycles of the user computer are not consumed generating the base index, thereby conserving processing power of the user computer for executing other, perhaps more critical, applications. Conserving processing power of the user computer by having the online content management service generate the base index instead of the user computer also extends the battery life of the user computer and increases the time between battery charges, if the user computer is a battery-operated portable user computer. Another advantage of this feature is that the relatively greater processing power provided by clustered and/or distributed computers of the online content management service can be used to generate a more comprehensive base index. For example, the online content management service can apply facial recognition algorithms and/or optical character recognition algorithms to digital images to generate text by which the digital images are indexed in the base index, which may not be practical to do at a user computer with limited processing capabilities. For example, the necessary specialized software for performing the facial recognition or optical character recognition algorithms may not be installed on the user computer for a variety of different reasons such as, for example, the high cost associated with purchasing such software.

The above and other advantages of embodiments of the invention will be apparent from the following more detailed description when taken in conjunction with the accompanying drawings. It is intended that the above advantages can be achieved by different aspects of the invention and the additional advantages of this invention will involve various combinations of the above independent advantages such that synergistic benefits may be obtained from combined techniques.

BRIEF DESCRIPTION OF THE DRAWINGS

The detailed description of embodiments of the invention will be made with reference to the accompanying drawings, wherein like numerals designate corresponding parts in the figures.

DETAILED DESCRIPTION OF EXAMPLE EMBODIMENTS

Figure 1:
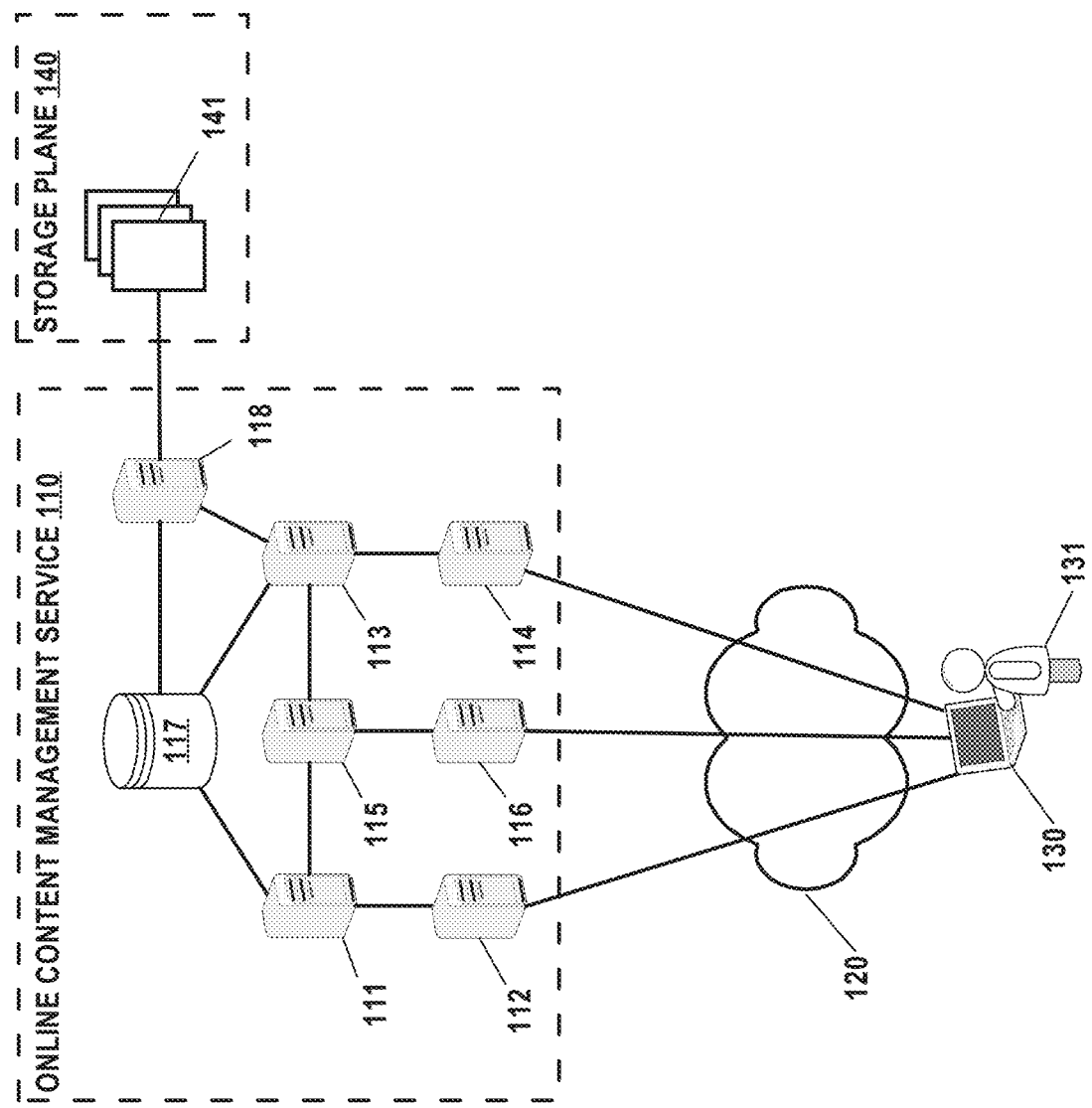
FIG. 1 is a communications network environment that includes a user computer and an online content management service in accordance with some embodiments of the invention.

Various embodiments of the invention are directed to a personal content item system and method for providing users that host their personal content items with an online content management service (e.g., file hosting services, cloud data storage providers) to more easily and effectively discover, search, browse, and locate their hosted content items using user computers. For example, various embodiments of the personal content item system facilitate a user using a user computer to perform a full-text search of the user's personal content items hosted with the service in situations where the user computer is not online (e.g., not connected to the online content management service by a communications network), or in situations where the user computer is online but without having to send a search query over a communications network in order to provide an answer to the query, which may result in an answer to the query being provided to the user more quickly and which may conserve battery power and extend battery life for portable user computers.

According to some embodiments of the invention, full-text searches are facilitated by maintaining an index of the user's hosted content items locally at the user computer. An answer to a search query can be provided to the user at the user computer in at least two ways, depending on whether the user computer is online or offline. First, whether the user computer is online or offline, the answer can be provided by consulting only the local index at the user computer. Second, if the user computer is online, the answer can be provided by consulting the local index at the user computer and sending the search query over a communications network to the online content management service, then combining results from the local index with results returned by the online content management service into an answer that is provided to the user.

According to an embodiment of the invention, an answer provided to the user may initially include only results from the local index while the user computer waits for results from the online content management service to be returned. As results from the online content management service are received at the user computer, the answer may then be updated to include the results from the online content management service. In this way, when the user computer is online, the user may be quickly provided with a preliminary answer to a search query with results from the local index and then soon after provided with a more comprehensive answer to the search query with results from the online content management service.

1.0 Network Environment

Various embodiments of the instant invention operate in accordance one or more sets of computer-executable instructions configured to perform various functions as described herein when executed by one or more computers, such as, for example, a user computer and one or more online content management service computers that are coupled together on a communications network, such as, for example, the Internet, a mobile telephone network or a wide area network.

FIG. 1 depicts a network system that operates in accordance with some embodiments of the present invention. With reference to FIG. 1, the online content management service 110 operates on a communications network 120, such as the Internet. The online content management service 110 includes a base index generator computer 111, a base index server computer 112, an index mutation generator computer 113, an index mutation server computer 114, a back-end search query processor computer 115, a front-end search query processor computer 116, a token store 117, and a tokenizer computer 118.

As used in this description and in the appended claims, the singular form of "computer" is intended to include the plural form as well, unless the context clearly indicates otherwise. For example, where a function, feature, or step of an embodiment of the invention is described herein as implemented by a single computer, that function, feature, or step may in other embodiments be implemented by multiple computers, for example, arranged in a computing cluster or in a distributed computing environment, unless the context clearly indicates otherwise. Further, functions, features or steps described herein in some embodiments as being performed by different computers may instead in other embodiments be performed by the same computer or the same set of computers.

The base index server computer 112, the front-end search query processor computer 116, and the index mutation server computer 114 may be coupled to one or more user computers 130 by a communications network 120. The communications network 120 may include a public network, such as the Internet, a mobile telephone network, a local area network, or any other suitable communications network, wired, wireless, or a hybrid thereof.

The user computer 130 may be used by a human user 131. The user computer 130 may be a conventional personal computer with wired and/or wireless network communications capabilities such as, for example, a desktop computer, workstation computer, laptop computer, mobile phone, cell phone, smart phone, set-top device, in-vehicle computer, personal digital assistant, or other personal computer with wired and/or wireless network communications capabilities.

In a highly-reliable network communications environment, such as, for example, where the user computer 130 is coupled to the communications network 120 by a wired local area network, the user computer 130 may be continuously or near continuously coupled to the online content management service 110. However, in less reliable network communications environments, the user computer 130 may only be intermittently or periodically coupled to the online content management service 110 by the communications network 120, depending on the configuration of the user computer 130 and/or the network environment in which the user computer 130 is situated. For example, the user computer 130 may be configured, for a variety of reasons (e.g., cost and/or network performance), to couple to the online content management service 110 via the communications network 120 only when the user computer 130 is coupled to the communications network 120 by a certain type of network, such as, for example, a wired or wireless local area network. Conversely, the user computer 130 may be configured to not couple to the online content management service 110 via the communications network 120 when the user computer 130 is coupled to the communications network 120 by another type of network, such as, for example, a mobile telephone network. In some cases, the user computer 130 may be located in a physical environment, such as, for example, on an airplane or in a remote geographic area, where there is no network available to the user computer 130 for coupling to the online content management service 110 via the communications network 120. Various embodiments of the present invention enable the user 131 of the user computer 130 to search the user's 131 hosted content items 141 in semi-connected environments in which the user computer 130 is only intermittently or periodically coupled to the online content management service 110 by the communications network 120.

The online content management service 110, which in an exemplary embodiment is the DROPBOX content management service provided by Dropbox, Inc. of San Francisco, Calif., may store (host) the user's 131 personal content items 141 on its server computers and/or on server computers that the service 110 manages. The server computers on which the user's 131 hosted content items 141 are stored may be part of a storage plane 140, which in an exemplary embodiment is the AMAZON S3 online file hosting web service provided by Amazon.com of Seattle, Wash. Features of the online content management service 110 may be provided to the user 131 according a variety of different monetary fee arrangements including, but not limited to, for free up to a certain amount of storage space of the storage plane 140 consumed by the user's 131 hosted content items 141, for a monthly, yearly, or other periodic service fee charged to the user 131, possibly based on the amount of storage space of the storage plane 140 consumed by the user's 131 hosted content items 141 during the period, among other possible fee arrangements.

1.1 Hosted Content Items

The user's 131 hosted content items 141 may include a wide variety of different types of content items. A "content item" may be defined as a collection of digital information that contains text content and/or is associated with text content. Some non-limiting examples of a content item include, but are not limited to, a word processing document, a spreadsheet document, a digital image, and other types of files, documents, and digital media. For example, a word processing document often contains text context in the form of the authored words and sentences of the document, a spreadsheet document may contain text context in the form of words and numbers, and a digital image (e.g., a digital photograph) may contain text content in its header (e.g., in Exchangeable image file format (Exif)).

A content item may correspond to a standardized or conventional file type such that the content of the content item has a standardized or conventional data format that conforms to that file type. Some standardized and conventional file types to which a content item may correspond to include, but are not limited to, image file types (e.g., jpg, .tiff, .gif), music file types (e.g., .mp3, .aiff, .m4a. wav), movie file types (e.g., .mov, .mp4, .m4v), word processing file types (e.g., .doc, .docx, .pages), presentation file types (e.g., .ppt, .pptx, .key), spreadsheet file types (e.g., .xls., .xlsx, .numbers), web page file types (e.g., .htm, .html), text file types (e.g., .txt), and any other standardized or conventional file type that contains and/or is associated with text context. While in some instances a content item corresponds to a standardized or conventional file type, a content item corresponds to a proprietary or unknown file type in other instances. In these instances, the content item may still contain and/or be associated with text content.

A content item may be associated with text content (also referred to herein as "textual metadata" of the content item) that is descriptive of the content item content. For example, the name (e.g., the filename) of a content item can be textual metadata for the content item. As another example, textual metadata for a digital image may be produced by a computer analysis of the image (e.g., by optical character recognition (OCR) or by a facial recognition algorithm). Other forms of textual metadata for a content item can include, for instance, text about the content item obtained from a web page that references the content item (e.g., by a hyperlink), mentions the content item (e.g., in a social networking post), or discusses the content item (e.g., in a blog post or user comments post).

For purposes of this description, textual metadata associated with a content item may be considered to be part of the text content of the content item itself. Accordingly, reference herein to the text content "contained in," "occurring in," or "of" a content item is meant to include the text content of the content item itself as well as any textual metadata associated with the content item, unless the context clearly indicates otherwise.

The above discussion provides just some examples of possible types of content items that may be among the user's 131 hosted content items 141.

1.2 Content Item Synchronization

The user's 131 hosted content items 141 may be provided to the online content management service 110 for storage in the storage plane 140 in a variety of different ways, including, but not limited to, by uploading the content items 141 from the user computer 130 to the storage plane 140 over the communications network 120 and/or by uploading the content items 141 from the user computer 130 to the online content management service 110 over the communications network 120, which, upon receiving the personal content items 141 from the user computer 130, stores the content items 141 in the storage plane 140. The online content management service 110 and the storage plane 140 may also be connected by a communications network, such as, for example, communications network 120. The storage plane 140 may offer a network interface, accessible by the user computer 130 and/or the online content management service 110 over the communications network 120, according to a network communications protocol (e.g., HTTP or HTTPS) for reading (download) and writing (uploading) content items 141 from and to the storage plane 140. The online content management service 110 may offer a similar network interface to the user computer 130.

The user's 131 hosted content items 141 may be synchronized with content items stored at the user computer 130. In this arrangement, a change to a content item at the user computer 130 may be sent over the communications network 120 to the online content management service 110 and/or the storage plane 140. Upon receiving the change from the user computer 130, the change may be applied to a corresponding one of the user's 131 hosted content items 141 stored in the storage plane 140, thereby synchronizing the changed content item at the user computer 130 with the corresponding content item 141 in the storage plane 140. After the change is applied to the corresponding content item 141 in the storage plane 140, the content item at the user computer 130 may be identical to the corresponding content item 141 in the storage plane 140.

Synchronization may be bi-directional. For example, the user 131 may store content items at more than one user computer. For example, the user 131 may store content items on a laptop computer 130 and also store content items on a mobile phone 130. In this case, a change to a content item at the user's 131 laptop computer 130 may be sent to the online content management service 110 and/or the storage plane 140 for application to a corresponding content item 141 in the storage plane 140 as described above. In addition, the change may also be sent from the online content management service 110 and/or the storage plane 140 to the user's 131 mobile phone 130 for application to a corresponding content item stored at the user's 131 mobile phone 130. After this bi-directional synchronization operation, the content item at the user's laptop computer 130, the corresponding content item in the storage plane 140, and the corresponding content item at the user's 131 mobile phone 130 may be identical.

A change to a content item sent from the user computer 130 to the online content management service 110 and/or the storage plane 140 may be caused by various different events occurring at the user computer 130. For example, the content item may have been recently modified, created, or deleted at the user computer 130. The user computer 130 may be configured with a synchronization application which may be implemented, for example, as a software program or set of computer-executable instructions.

The synchronization application at the user computer 130 may be configured to perform various synchronization operations on content items including, but not limited to, detecting changes to content items at the user computer 130, sending detected content item changes to the online content management service 110 and/or the storage plane 140 over the communications network 120, receiving content item changes from the online content management service 110 and/or the storage plane 140 over the communications network 120, and applying received content item changes to content items at the user computer 130.

In some cases, one or more of the user's 131 hosted content items 141 may be shared with one or more other users of the online content management service 110. For example, the user 131 may belong a team of users that collaborate and share content items through the online content management service 110. In this case, changes to content items at one of the team member's user computers 130 may be synchronized with corresponding content items 141 in the storage plane 140 and also corresponding content items at the other team members' user computers 130.

Thus, either because of synchronization or otherwise, the user's 131 hosted content items 141 may change from time to time. Various embodiments of the present invention allow the user 131 to search at the user computer 130 for changes to the user's 131 hosted content items 141 soon after (e.g., within minutes or seconds) after the changes are made.

In some cases, one or more of the user's 131 hosted content items 141 are not synchronized with (stored at) a particular one of the user's 131 user computers 130. In other words, the user's 131 hosted content items 141 are selectively synchronized with the particular user computer 130. For example, the user 131 may configure the synchronization application at the user's 131 mobile phone 130 to not synchronize the user's 131 hosted digital photos 141 with the mobile phone 130 but synchronize all other of the user's 131 hosted content items 141 with the mobile phone 130. The user 131 may configure the synchronization application in this way, for example, to conserve data storage space at the mobile phone 130 or for other reasons (e.g., conserve network bandwidth by not downloading the digital photos to the mobile phone 130). As another example, the synchronization application at the mobile phone 130 may be configured to automatically determine which of the user's 131 hosted content items 141 to synchronize with (store at) the mobile phone 130. For example, the synchronization application may be configured to treat the mobile phone 130 as a local cache of some of the user's 131 hosted content item 141 in which the user's 131 hosted content item 141 that were most recently accessed and/or that are most likely to be accessed in the future are synchronized with (cached at) the mobile phone 130. Thus, because of selective synchronization, a user's 131 user computer 130 may store at a given time only a subset of the user's 131 content items 141 hosted with the online content management service 110. Various embodiments of the present invention allow the user 131 to search the user's 131 hosted content items 141 at the user computer 130 even if some or all of the user's 131 hosted content items 141 are not synchronized with (stored at) the user computer 130 at the time of the search.

1.3 User Accounts

The storage plane 140 may store content items 141 for multiple users (e.g., millions of users or more). The set of content items 141 among all content items 141 stored in the storage plane 140 that belong to a particular user (e.g., 131) may be established by a user account that the user maintains with the online content management service 110. For example, user 131 may hold a user account with the online content management service 110 and the user's 131 hosted content items 141 may be associated with the user account. In this way, the online content management service 110 can determine which of the content items 141 in the storage plane 140 are the user's 131 content items 141. As part of this determination, the online content management service 110 may authenticate the user 131 with valid authentication credentials (e.g., a valid username/password pair) provided by the user computer 130 to identify the user's 131 user account in a user account database (not shown). Once identified, the online content management service 110 and/or the storage plane 140 can authorize (e.g., allow or deny) requests from the user computer 130 (e.g., the synchronization application on the user computer 130) to access (e.g., read or write) content items 141 in the storage plane 140 identified in the requests based on whether the identified content items are associated with user's 131 user account.

An association between the user's 131 user account and one of the user's 131 hosted content items 141 in the storage plane 140 may be established by way of a unique identifier of the content item 141. For example, the content item identifier may include a unique 64-bit value that uniquely identifies the content item 141. However, the content item identifier may be represented with fewer or more bits according to the requirements of the particular implementation at hand.

1.4 Content Item Namespaces

The user's 131 hosted content items 141 may be organized into one or more "content item namespaces." A content item namespace may be defined as a collection of one or more content items 141 under common access control. The common access control can be based on explicit and/or implicit permissions specifying and/or indicating which user(s) and/or group(s) of users have access to the content items 141 in the content item namespace and what access (e.g., one or more of read access, write access, share access, preview access, download access, etc.) the user(s) and/or group(s) of users have on the content items 141 that belong to the content item namespace. Explicit permissions may come in the form of, for example, one or more access control lists (ACLs) and/or other data associated with the content item namespace (or an identifier thereof) specifying and/or indicating which user(s) and/or group(s) of users have access to the content items 141 in the content item namespace and what access the user(s) and/or group(s) have on the content items 141 in the content item namespace. One example of an implicit permission may be: the user 131 has access to all content items 141 in a content item namespace associated with a user account (or an identifier thereof) of the user 131.

In an exemplary embodiment of the invention, a "default" content item namespace includes content items 141 associated with the user's 131 user account held with a cloud data storage service such as, for example, the aforementioned DROPBOX content management service. By successfully authenticating against the user account (e.g., with a valid username/password), the user 131 implicitly has access to the content items 141 in the default content item namespace associated with the user's 131 user account.

In an exemplary embodiment of the invention, a "shared" content item namespace includes content items 141 belonging to a collection of content items 141 that are shared among multiple user accounts held with an online data storage service such as, for example, the aforementioned DROPBOX content management service. In some instances, the collection of content items 141 may be referred to as a "shared folder." By successfully authenticating against a user account with which the collection of content items 141 is shared, the user 131 has access to the content items 141 in the shared content item namespace.

Instead of direct associations between the user's 131 user account and the unique identifiers of the user's 131 hosted content items 141, indirect associations between the user's 131 user account and the user's 131 hosted content items 141 may be established by way of unique identifiers of content item namespaces to which the content items 141 belong. For example, the content item namespace identifier may include a unique 64-bit value that uniquely identifies the content item namespace. However, the content item namespace identifier may be represented with fewer or more bits according to the requirements of the particular implementation at hand. In this case, there may be separate direct associations between content item namespace identifiers and content item identifiers mapping the user's 131 content items 141 to the content item namespaces they belong to. As a simple example, the user's 131 user account may be associated with two content item namespaces with unique identifiers of, for example, ABCD and DEFG. Further, content item namespace ABCD, which may, for example, be a default content item namespace, may be associated with the unique identifiers of one or more content items 141 that belong to the default content item namespace ABCD and content item namespace DEFG, which may, for example, be a shared content item namespace, may be associated with the unique identifiers of one or more content items 141 that belong to the shared content item namespace DEFG. From these associations, once the user 131 is authenticated and the user's 131 user account identified, the unique identifiers of the user's 131 content item namespaces and the user's 131 hosted content item 141 can be identified by the online content management service 110.

1.5 Query Processing Approaches

A graphical user interface may be presented to the user 131 by the user computer 130. For example, the user computer 130 may present the graphical user interface on a video display device, such as, for example, display 1012 of computer 1000. Through the graphical user interface, the user 131 may provide a search query and receive an answer to the search query. In some embodiments, the graphical user interface includes a web page or a series of web pages for receiving the search query from the user 131 and for presenting the answer to the search query to the user 131. However, the graphical user interface is not limited to web pages and the graphical user interface may include other types of windows, icons, menus, and graphics for receiving the search query from the user 131 and for presenting the answer to the search query to the user 131.

A search query provided by the user 131 through the graphical user interface at the user computer 130 may comprise a search expression. The syntax of the search expression may include a sequence of one or more query tokens, possibly related together by one or more Boolean operators (e.g., AND, OR, NOT, etc.). A token may be defined as a sequence of one or more characters. A character in a token may be encoded according to a conventional character encoding scheme (e.g., ASCII, UTF-8, and the like)

A query token may be defined as a token that appears in the search query. For example, consider the simple conjunctive search query: [baguette fromage] (without the enclosing brackets). A hosted content item 141 satisfying this search query may contain both the token "baguette" and the token "fromage" without necessarily being next to each other in the content item 141 and without the token "baguette" necessarily appearing before the token "fromage" in the content item 141. However, a hosted content item 141 that contains or is associated with the tokens "baguette" and "fromage" near each other and with the token "baguette" before the token "fromage" may be considered more relevant than other of the user's 131 hosted content items 141 satisfying the search query.

An answer to a search query presented in the graphical user interface of the user computer 130 may comprise a list search answer summaries. Each such summary may correspond to a content item 141 identified in an index as relevant to the search query. A content item 141 identified in an index as relevant to a search query and included in an answer to the search query is also referred to herein as a "search result" or just "result" of the search query. A search answer summary may include, for example, an identifier (e.g., a name, a title, etc.) of the identified content item 141, a short description (e.g., a synopsis, abstract, extract, snippet, etc.) of the identified content item 141, an interactive hyperlink (e.g., a Uniform Resource Locator (URL)) to the identified content item 141 for downloading, viewing, or taking some other user action on the identified content item 141, and possibly other useful information about the identified content item 141 (e.g., a thumbnail image of the relevant content item 141).

In some cases, a content item 141 corresponding to a search answer summary may not have a corresponding content item stored at the user computer 130. For example, a corresponding content item may not be stored at the user computer 130 because of selective synchronization. According to some embodiments of the present invention, a search answer summary presented in the graphical user interface at the user computer 130 visually indicates whether the content item 141 corresponding to the search answer summary has a corresponding content item stored at the user computer 130. The visual indication can be a visual grouping with other search answer summaries corresponding to content items 141 that do not have corresponding content items stored at the user computer 130, a textual or graphical indicator displayed in conjunction with or near (e.g., adjacent to) the search answer summary, or some other visual indicator that indicates that the corresponding content item 141 does not have a corresponding content item stored at the user computer 130. By providing such an indication, the user 131 can understand that to access (e.g., view) the content item the user 131 may need to access the content item 141 stored in the storage plane 140 through the online content management service 110.

In some cases, a content item 141 corresponding to search answer summary is a newer version of the content item than the version of the corresponding content item stored at the user computer 130. For example, changes resulting in the newer version of the content item stored in the storage plane 140 may not have been synchronized yet to the user computer 130 at the time the search is conducted. According to some embodiments of the present invention, a search answer summary presented in the graphical user interface at the user computer 130 visually indicates whether the content item 141 corresponding to the search answer summary is newer (more recent) than the version of the corresponding content item stored at the user computer 130. By providing such an indication, the user 131 can understand that the version of the corresponding content item stored at the user computer 130 may be out-of-date with respect to the version of the content item stored in the storage plane 140.

The user computer 130 may include a local query processor for processing a search query provided by the user 131 through the graphical user interface at the user computer 130. The local query processor can process the search query in a variety of different ways in order to identify content items 141 of the user 131 that are relevant to the search query and to include in the answer to the search query. Three different possible query processing approaches are described below and termed a "local approach," a "remote approach," and a "hybrid local/remote approach." Query processing approaches other than those described below may be used according to the requirements of the particular implementation at hand.

In the following description of the local, remote, and hybrid local/remote approaches for processing a search query, for purposes of providing clear examples, the terms "local" and "remote" are defined relative to the user computer 130.

In the "local approach" for processing the search query, the local query processor consults a local index with the search query to identify content items 141 of the user 131 that are relevant to the search query and to include in a local answer to the search query. The local approach for processing the search query is useful to quickly provide an answer to the user 131 in response to receiving the search query. The answer can be provided quickly because the search query can be processed locally at the user computer 130 without having to send the search query over a communications network (e.g., 120) and without having to wait for an answer to the search query to be returned on the communications network. The local approach is also useful if the user computer 130 is an offline network communications environment in which the user computer 130 does not currently have network connectivity with communications network 120 or online content management service 110.

In the "remote approach" for processing the search query, the local query processor sends the search query over the communications network 120 to the front-end query processor computer 116 of the online content management service 110. The search query is then processed by a remote query processor of the online content management service 110. The remote query processor may be implemented by the front-end query processor computer 116 and/or the back-end query processor computer 115. The remote query processor may consult a remote index to identify content items 141 of the user 131 that are relevant to the search query and to include in a remote answer to the search query that is returned to the user computer 130 over the communications network 120 by the front-end query processor computer 116. The remote approach of processing the search query is useful if a more comprehensive answer to the search query is desired. The remote answer obtained by consulting the remote index with the search query may be more compressive than a local answer obtained by consulting the local index with the search query because the remote index may be more up-to-date with respect to the current state of the user's 131 hosted content items 141 stored in the storage plane 140. For example, because of the network proximity and/or availability of the storage plane 140 to the back-end query processor computer 115, a change to one of the user's 131 hosted content items 141 may be indexed in the remote index sooner than the change is indexed in the local index at the user computer 130. Techniques in some embodiments that may be employed by the front-end query processor computer 116 and the back-end query processor 115 computer for processing a search query received from the user computer 130 may be as described in the following related applications: U.S. patent application Ser. No. 14/555,147, "Multi-User Search System With Methodology For Personal Searching," filed on Nov. 26, 2014; and U.S. patent application Ser. No. 14/555,171, "Multi-User Search System With Methodology For Personalized Search Query Autocomplete," filed on Nov. 26, 2014. The entire contents of each of these applications is hereby incorporated by reference, for all purposes.

In the "hybrid local/remote approach," the local query processor at the user computer 130 both (1) consults the local index with the search query and (2) sends to the search query over the communications network 120 to the front-end query processor computer 116. This approach is useful to quickly obtain a local answer to the search query as with the local approach and also to obtain a more comprehensive answer as with the remote approach. In a typical scenario, the local query processor will obtain a local answer from the local index before the user computer 130 receives the remote answer from the front-end query processor computer 116. The local answer can be presented to the user 131 in the graphical user interface at the user computer 130 as soon as the local answer is obtained. When the remote answer is received at the user computer 130, the presented answer can then be updated with results from the remote answer.

In some embodiments, ranking scores for search results in the local answer and ranking scores for search results in the remote answer are computed according to the same ranking algorithm. In particular, the local ranking algorithm used by the local query processor to compute ranking scores for search results in the local answer may be the same as the remote ranking algorithm used by the remote query processor to compute ranking scores for search results in the remote answer. By doing so, ranking scores for local and remote search results are comparable and the local query processor can determine, based on the ranking scores for the remote search results in the received remote answer, whether any of the remote search results have a better (e.g., higher) ranking score than the worst (e.g., lowest) ranked local search result currently presented in the graphical user interface at the user computer 130. If there are any such better ranked remote search results, then the graphical user interface may be updated to display the better ranked remote search results in addition to or instead of worse ranked local search results.

1.6 Tokenizer and Token Store

The tokenizer computer 118 tokenizes content items 141 stored in the storage plane 140 and stores sets of tokens for the tokenized content items 140 in a token store 117. The tokenizer computer 118 may tokenize a content item 141 in the storage plane 140 at various different times including on a periodic basis (e.g., once a day, once a week) or after the content item 141 is changed. When the tokenizer computer 118 tokenizes a content item 141 in the storage plane 140, the tokenizer computer 118 produces a set of tokens and stores the set of tokens in the token store 117. For a given content item 141, the token store 117 may store one or more sets of tokens, one which corresponds to the most recent version of the given content item 141 tokenized by the tokenizer computer 118. Other sets of tokens in the token store 117 for the given content item 141 may correspond to prior versions of the given content item 141 tokenized by the tokenizer computer 118.

As a simple example, a first version of a content item 141 containing the text "solved two problems" may be stored in the storage plane 140. At a first time, the tokenizer computer 118 may tokenize the first version of the content item 141 to produce the set of tokens: "solved" "two" "problems," which the tokenizer computer 118 then stores in the token store 117. Later, at a second time after the first time, a second version of the content item 141 containing the text "solved three problems" may be stored in the storage plane 140. The tokenizer computer 118 may then tokenize the second version of the content item 141 to produce the set of tokens: "solved" "three" "problems," which the tokenizer computer 118 also stores in the token store 117. As part of processing the first and second versions of the content item 141, the tokenizer computer 118 may store metadata (e.g., version information) in the token store 117 that indicates that the set of tokens: "solved" "three" "problems" is for the second version of the content item 141 and the set of tokens: "solved" "two" "problems" is for the first version of the content item 141.

In some embodiments of the invention, the token store 117 includes a column-oriented, distributed database system such as, for example, the APACHE HBASE database system. However, other types of database systems may be used in other embodiments according to the requirements of the particular implemented at hand. For example, a proprietary, a relational, or a stand-alone database system may be used instead of an open source, a column-oriented, or a distributed one.

The tokenizer computer 118 may produce a set of tokens for a content item 141 by tokenizing the text content of the content item 141. Recall the text content of a content item 141 may include any textual metadata associated with content item 141 as well as any text content of the content item 141 itself. Tokenizing the text content of the content item 141 may include obtaining one or more character sequences of the text content. Various techniques may be used by the tokenizer to obtain a character sequence of the text content depending on the format of the text content. For example, the techniques used may include decoding the text content depending on the character encoding scheme of the text content (e.g., ASCII, Unicode UTF-8, MICROSOFT WORD, ADOBE PDF, etc.) and/or uncompressing the text content depending on whether the text content is compressed (e.g., by ZIP compression).

Once a character sequence of the text content is obtained, the tokenizer computer 118 may divide the character sequence into pieces, called tokens, possibly performing linguistic processing on tokens at the same time. Linguistic processing may include, for instance, ignoring certain characters (e.g., punctuation), dropping common words (e.g., stop words), and/or stemming and lemmatization. Linguistic processing may also include token normalization including removing diacritics and accents and/or capitalization/case-folding, and the like.

1.7 Base Index

The base index generator computer 111 may be configured to generate a "base index" of some or all of the user's 131 hosted content items 141. The base index generator computer 111 may generate the base index at various different times including, but not limited to, periodically (e.g., once a day, once a week) and/or in response to a detected event (e.g., in response to a receiving a command to generate the base index).

Generally, the base index may be structured as an inverted index having a dictionary of index tokens and corresponding postings. More specifically, the base index may be structured as a collection of key-value pairs (e.g., as an associate array) in which the keys correspond to index tokens in the dictionary and the values correspond to postings lists in the postings. For a given content item 141 to be indexed in the base index, the base index generator computer 111 obtains the set of tokens in the token store 117 for the most recent version of the given content item 141 tokenized by the tokenizer computer 118. Once this set of tokens is obtained, the base index generator computer 111 may add or modify key-value pairs in the base index based on the set of tokens. In particular, for a given token in the set of tokens, if there is currently no key-value pair for the given token in the base index, the base index generator computer 111 may create a new key-value pair in the base index with a key that includes the given token and a value that includes a postings list that identifies the given content item 141. Alternatively, if there is a key-value pair for the given token in the base index, the base index generator computer 111 may then modify the postings list value to identify the given content item 141.

The base index server computer 112 may be configured to provide a base index generated by the base index generator computer 111 to the user computer 130 over the communications network 120. The base index server computer 112 may provide the generated base index to the user computer 130 over the communications network 120 at various different times including, but not limited, in response to a network request received from the user computer 130.

In some embodiments, the base index server computer 112 is part of the storage plane 140. In these embodiments, the base index generated by the base index generator computer 111 is treated as one of the user's 131 hosted content items 141 and provided to the user computer 130 over the communications network 120 as part of a content item synchronization operation. According to these embodiments, the base index generator computer 111 may store the base index in the storage plane 140 after generating the base index based on the user's 131 hosted content items 141. Thereafter, the base index is treated as one of the user's 131 hosted content items 141 for purposes of synchronizing the base index in the storage plane 140 with the current base index at the user computer 130. Significantly, the base index in the storage plane 140 may be provided to the user computer 130 as part of the content item synchronization operation only if the base index in the storage plane 140 differs from the current base index at the user computer 130 or if there is no current base index at the user computer 130. In this way, the user computer 130 may receive as part of a regular, periodic, or opportunistic content item synchronization operation between the synchronization application on the user computer 131 and the online content management service 110, the latest base index generated by the base index generator computer 111 of the user's 131 hosted content items 141.

1.8 Index Mutations

The tokenizer computer 118 may notify the index mutation generator computer 113 after tokenizing a changed content item 141 and storing the set of tokens produced for the changed content item 141 in the token store 117. For example, the index mutation generator computer 113 may be notified by the tokenizer computer 118 after one of the user's 131 hosted content items 141 is modified, created, or deleted in the storage plane 140.

In response to receiving notification of a changed content item 141 from the tokenizer computer 118, the index mutation generator computer 113 may generate an index mutation reflecting the change to the changed content item 141 and store the index mutation in an index mutation journal of the index mutation generator computer 113. In some embodiments, the index mutation journal is implemented as a distributed append-only commit log.

If the changed content item 141 was modified in the storage plane 140, then the index mutation generated for the change may include one or more tokens to use to index the changed content item 141 and/or one or more tokens to not use to index the changed content item 141. The one or more tokens to use to index the changed content item 141 may include tokens that are contained in the content item 141 after the change but that were not contained in the content item 141 before the change. The one or more tokens to not use to index the changed content item 141 may include tokens that were contained in the content item 141 before the change but that are not contained in the content item 141 after the change.

In the case where the changed content item 141 is modified in the storage plane 140, the index mutation generator computer 113 may identify any tokens to use to index the modified content item 141 and any tokens to not use to index the modified content item 141 by comparing the set of tokens for the most recent version of the content item 141 in the token store 117 to the set of tokens for a prior version of the content item 141 in the token store 117. For example, assume the set of tokens in the token store 117 for the most recent version of the content item 141 after the modification is: "solved" "three" "problems" and the set of tokens in the token store 117 for the prior version of the content item 141 before the modification is: "solved" "two" "problems." In this case, the index mutation generator computer 113 may identify the token "three" as a token to use to index the modified content item 141 and the token "two" as a token to not use to index the modified content item 141.

In the case where the changed content item 141 is added to the storage plane 140, then the index mutation may include one or more tokens to use to index the new content item 141. For example, assume the set of tokens in the token store 117 for the current version of the content item 141 after the addition is: "solved" "three" "problems." In this case, the index mutation generator computer 113 may identify the tokens "solved," "three" and "problems" as tokens to use to index the new content item 141.

If the changed content item 141 was deleted from the storage plane 140, then the index mutation may include one or more tokens to not use to index the deleted content item 141. For example, assume the set of tokens in the token store 117 for the most recent version of the content item 141 before the deletion is: "solved" "three" "problems." In this case, the index mutation generator computer 113 may identify the tokens "solved," "three" and "problems" as tokens to not use to index the deleted content item 141.

As mentioned above, an index mutation generated for a changed content item 141 by the index mutation generator computer 113 may be stored in the index mutation journal of the index mutation generator computer 113. In doing so, the index mutation generator computer 113 may store the index mutation in the journal in association with a "journal timestamp" reflecting a time the content item 141 was changed. Thus, index mutations for changes to content items 141 may be stored in the journal in an order that reflects the order in which the changes to the content items 141 occurred.

The index mutation server computer 114 may send index mutations over the communications network 120 to the user computer 130 retrieved from the index mutation journal. The index mutation server computer 114 may send index mutations to the user computer 130 over the communications network 120 at various different times including, but not limited to, in response to a network request from the user computer 130, in response to the index mutation server computer 114 storing an index mutation in the index mutation journal, and/or on occurrence of a periodic interval (e.g., a one minute interval).

To determine which index mutations in the index mutation journal to send to the user computer 130, the index mutation server computer 114 may compare the journal timestamps associated with the index mutations in the index mutation journal to a "local index timestamp" associated with the user computer 130. The local index timestamp reflects a point in time up to which a "local index" at the user computer 130 is up-to-date with respect to changes to the user's 131 hosted content items 141.

The user computer's 130 local index timestamp may be stored at the user computer 130 and provided to the index mutation server computer 114. Alternatively, the online content management service 110 may maintain the user computer's 130 local index timestamp. In either case, the user computer's 130 local index timestamp may be updated at various different times including, but not limited to, whenever the user computer 130 obtains a new base index and whenever the user computer 130 obtains an index mutation. As mentioned, the index mutation server computer 114 may compare journal timestamps associated with index mutations in the index mutation journal to the user computer's 130 local index timestamp to determine index mutations for the user computer 130 in the index mutation journal to provide to the user computer 130.

To determine whether a given index mutation in the index mutation journal should be provided to the user computer 130, the index mutation server computer 114 may compare the journal timestamp associated with given index mutation in the index mutation journal to the current local index timestamp for the user computer 130. If the journal timestamp for the given index mutation is more recent than the user computer's 130 local index timestamp, then the index mutation server computer 114 may determine to provide the index mutation to the user computer 130. On the other hand, if the journal timestamp for the given index mutation is less recent than the local index timestamp, then the index mutation server computer 114 may determine not to provide the index mutation to the user computer 130. In this way, the user computer 130 may be provided with index mutations for changes to the user's 131 hosted content items 141 that are not already indexed in the local index at the user computer 130.

With the above background in mind, example embodiments of the structure and operation of the local index of the user computer 130, the index mutation journal of the index mutation generator computer 113, and the token store 117, followed by an example process for indexing the user's 131 hosted content items 141 at the user computer 130 and an example process for searching the user's 131 hosted content items 141 at the user computer 130, are described below.

2.0 Local Index

Figure 2:
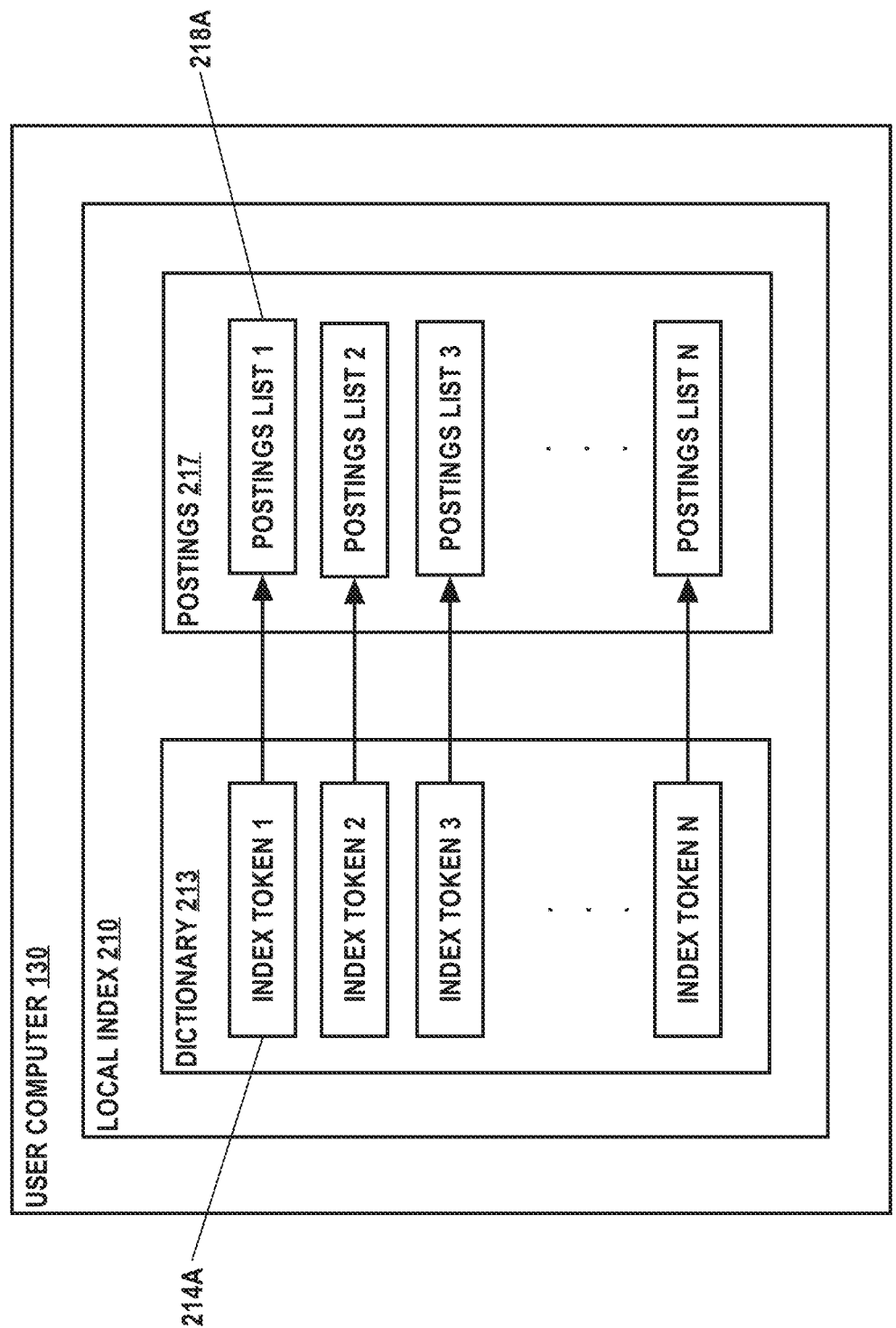
FIG. 2 is a schematic diagram of a local index at the user computer of a user's content items hosted by the online content management service in accordance with some embodiments of the invention.

Turning now to FIG. 2, it is a schematic diagram of a local index 210 that may be stored at the user computer 130 of the user's 131 hosted content items 141, according to some embodiments of the present invention. The local index 210 may be structured as an inverted index including a dictionary 213 and a corresponding postings 217.

Dictionary 213 may comprise index tokens 214 by which the user's 131 hosted content items 141 are indexed at the user computer 130. Dictionary 213 also includes a pointer for each index token (e.g. 214A) to a postings list (e.g. 218A). Each postings list (e.g. 218A) includes one or more content item identifiers that identify which of the user's 131 content items 141 the corresponding index token (e.g. 214A) occurs in. An index token (e.g., 218A) in the local index 210 may correspond to a token produced by the tokenizer computer 118 when tokenizing the text content of one or more of the user's 131 hosted content items 141.

Dictionary 213 may also comprise information other than index tokens 214 such as, for example, index token attribute information such as, for example, index token frequency information or other information that may be used by the local query processor in a ranking algorithm to rank or otherwise determine the relevancy of content items 141 to a search query in a query-dependent and/or query-independent manner.

A postings list (e.g. 218A) of postings 217 may comprise information other than content item identifiers, such as, for example, content item-index token attribute information, such as, for example, frequency of an index token (e.g. 214A) within a particular content item 141, the position or positions of an index token (e.g. 214A) within a particular content item 141, or other information that may be used by the local query processor in a ranking algorithm to rank or otherwise determine the relevancy of content items 141 to a query in a query-dependent and/or query-independent manner.

According to some embodiments, all of the following content item-index token attributes, or a subset or a superset thereof, are associated with a content item identifier of a content item 141 in a postings list (e.g., 218A) for a corresponding index token (e.g. 214A) of the local index 210:

A value indicating whether the corresponding index token is part of the filename of the content item 141, A value indicating whether the corresponding index token is part of the filename extension of the content item 141, A value indicating whether the corresponding index token is part of the file path of the content item 141, A value indicating whether the corresponding index token is part of the title of the content item 141, and/or A value indicating whether the corresponding index token is bolded or otherwise highlighted in the text content of the content item 141.

In addition to using any of the above content item-index token attributes in a ranking algorithm to rank or otherwise determine the relevancy of content items 141 to a query in a query-dependent and/or query-independent manner, the local query processor may use any of the above content item-index token attributes when generating a search answer summary of a content item 141 that matches a query. For example, if a query token of the query matches an index token (e.g. 214A) generated from the filename of the content item 141, then the generated search answer summary may indicate that fact, for example, by displaying the filename of the content item 141 in the search answer summary and visually highlighting (e.g. by bolding or by underling) the index token as it appears in the filename.

According to some embodiments, all of the following content item attributes, or a subset or a superset thereof, are associated at the user computer 130 with a content item identifier of a content item 141 indexed in the local index 210:

The content item's 141 size (e.g. in bytes),
A modification date/time of the content item 141,
A value indicating whether the content item 141 is deleted from the storage plane 140,
A value indicating whether a content item corresponding to the content item 141 is stored at the user computer 130,
If a content item corresponding to the content item 141 is stored at the user computer 130, a value indicating whether the version of the content item corresponding to content item 141 stored at the user computer 130 is out-of-date with respect to the version of the content item 141 indexed in the local index 210,
A value indicating the version of the content item 141 indexed in the local index 210,
A value indicating whether all available text content of the content item 141 has been tokenized by the tokenizer 118,
A value indicating whether the content item 141 is shared among more than one user of the online content management service 110 (e.g., associated with more than one user account of the online content management service 110),
If the content item 141 is shared among more than one user of the online content management service 110, a list of user identifiers (and/or user account identifiers) of one or more users sharing the content item 141,
A timestamp indicating a date/time the content item 141 was stored in the storage plane 140,
The number of tokens extracted from the content item 141 by the tokenizer 118,
A text summary/digest of the content item 141, and/or
A text snippet from the content item 141.

In addition to using any of the above content item attributes in a ranking algorithm to rank or otherwise determine the relevancy of content items 141 to a query in a query-dependent and/or query-independent manner, the local query processor may use any of the above content item-index token attributes when generating a search answer summary of a content item 141 that matches a query. For example, the text summary/digest of a content item 141 and/or the text snippet from the content item 141 may be presented in a search answer summary of the content item 141.

In some embodiments of the invention, for space efficiency and to reduce the computer storage size of postings 217, a content item identifier in a postings list 218 includes a local identifier that is local to the user computer 130 and substitutes for a global content item identifier that is larger in size in terms of the number of bytes needed to represent the global content item identifier. The local content item identifier may be smaller in size in terms of number of bytes need to represent the local content item identifier than the global content item identifier that the local content item identifier substitutes for. In this description, unless otherwise clearly apparent in context, a "content item identifier" of a content item 141 refers to all possible forms of the content item identifier that directly or indirectly (e.g. through a mapping) uniquely identifies the content item 141 including a local content item identifier of the content item 141 and a global content item identifier of the content item 141.

According to some embodiments of the invention, when a search query is received at the local query processor, the local query processor uses the query tokens in the query as keys into the dictionary 213 of the local index 210 to identify the corresponding postings lists 218. If there are multiple query tokens in the query, the corresponding postings lists 218 may be merged appropriately depending on how the query tokens are related together as a Boolean expression. A number of different merge algorithms may be used for this purpose according to the requirements of the particular implementation at hand.

When processing a search query against the local index 210, the local query processor at the user computer may load the dictionary 213 (or a portion thereof) from non-volatile storage (e.g., flash memory, hard disk) of the user computer 130 into volatile memory (e.g., RAM) of the user computer 130 for more efficient access. A postings list (e.g. 218A) may also be stored cached in volatile memory of the user computer 130 for more efficient access. Cached postings lists 218 may be evicted from volatile memory of the user computer 130 according to a cache eviction policy such as, for example, a least recently accessed policy. The local query processor may also cache in volatile memory of the user computer 130 a postings list (e.g. 218A) that is generated as a result of a merge algorithm performed on multiple posting lists 218 retrieved from the postings 217. By doing so, the local query processor may avoid having to perform the merge algorithm on the multiple postings lists 218 at a later time, such as, example, when a search query is processed that has query tokens in common with an earlier processed query.

3.0 Basic Query Processing

Figure 3:
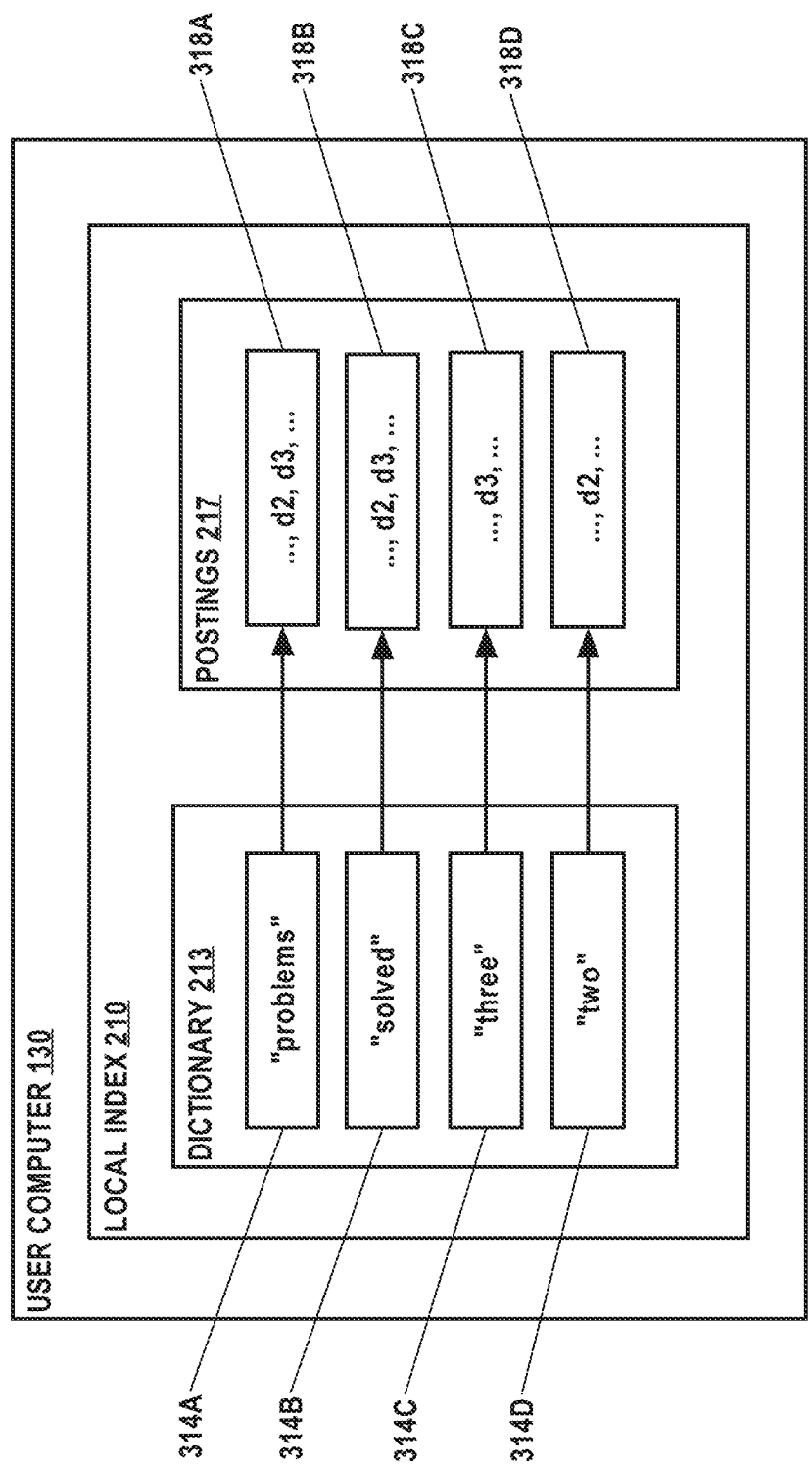
FIG. 3 is a schematic diagram of a basic query processing operation against the local index in accordance with some embodiments of the invention.

Turning now to FIG. 3, it is a schematic diagram of basic query processing performed by the local query processor of the user computer 130 when processing a search query against the local index 210, according to some embodiments of the present invention. The dictionary 213 may include index tokens and the postings 217 may include postings lists other than those shown in FIG. 3.

When a search query with multiple query tokens is received from the user 131 and provided to the local query processor, the tokens in the search query are used to cache (store) in volatile memory of the user computer 130 the relevant posting lists in postings 217 from the local index 210, if the relevant posting lists are not already cached (stored) in the volatile memory. Then, the local query processor executes a merge algorithm on the relevant postings lists to identify content items 141 satisfying the query.

To illustrate basic query processing by an example, consider the search query [two problems] (not including the enclosing brackets [ ]). In this example, the local index 210 indexes at least two of the user's 131 content items 141. Assume, for purposes of providing a clear example, the two content items 141 have identifiers of D2 and D3, respectively. Further assume, content item 141 D2 contains the text content "solved two problems" and content item 141 D3 contains the text content "solved three problems." Accordingly, content item 141 D2 is indexed in the local index 210 by the index tokens "solved," "two" and "problems" and content item 141 D3 is indexed in the local index 210 by the index tokens "solved," "three" and "problems."

In response to receiving the query [two problems] from the user 131, the local query processor caches (stores) in volatile memory of the user computer 130 the postings lists from the local index 210 associated with the index tokens matching the query tokens in the query, if the postings lists are not already cached (loaded) in the volatile memory. Specifically, the postings lists 318A and 318B associated with the index token 314A "problems" and the index token 314D "two," respectively, are cached in the volatile memory, if not already loaded there. Once cached, the local query processor identifies the content items 141 that satisfy the query by executing a merge algorithm on the loaded postings lists 318A and 318D. In this example, the merge algorithm may intersect the postings lists 318A and 318D to identify content item 141 D2 but not content item 141 D3 as satisfying the user's 131 query. An indication that content item 141 D2 satisfies the query may thereafter be provided to the user 131 in a search answer summary presented in the graphical user interface at the user computer 130.

4.0 Base Index and Delta Index

Figure 4:
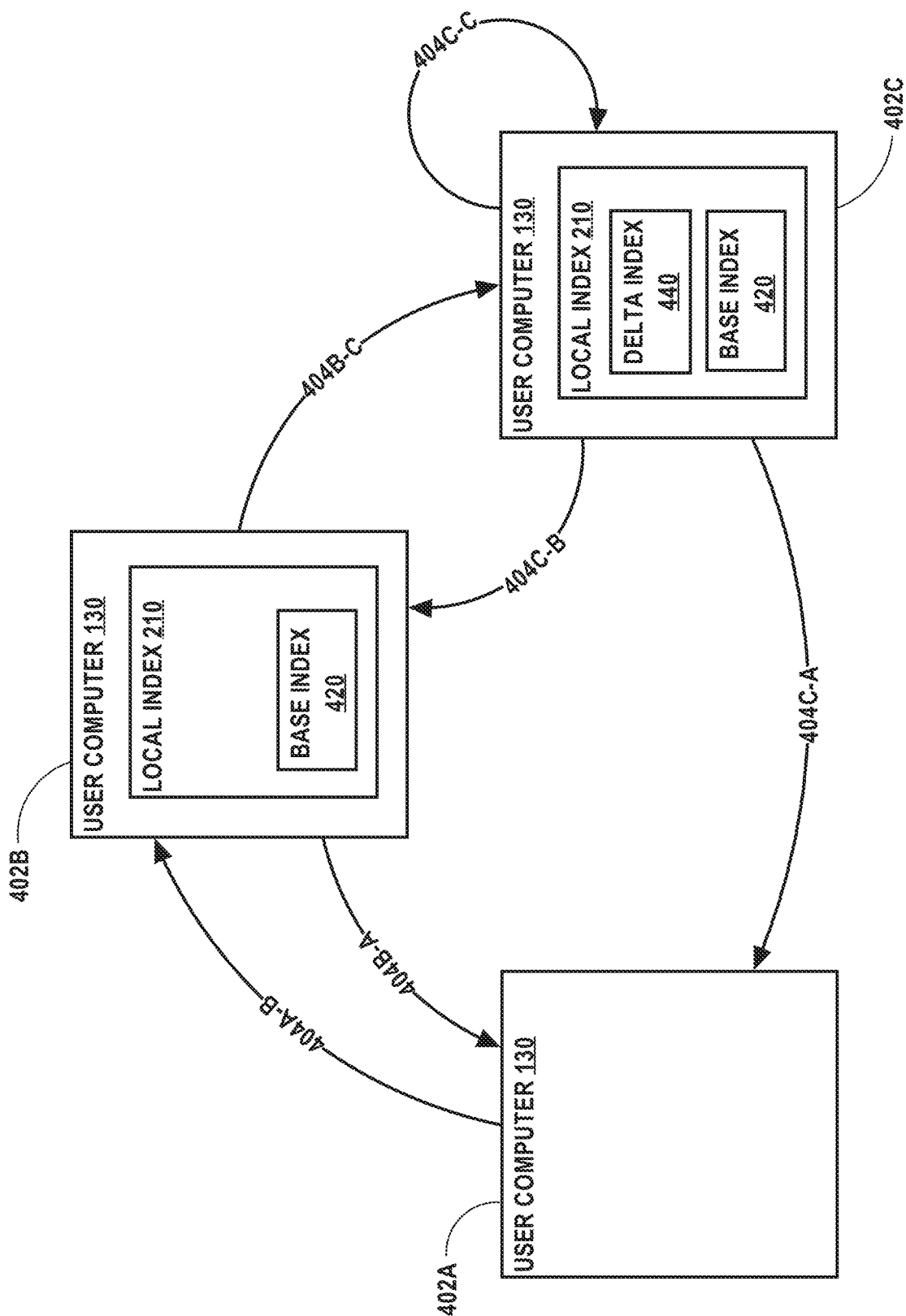
FIG. 4 is a state diagram of various possible states of the local index at the user computer in accordance with some embodiments of the invention.

Turning now to FIG. 4, it is a state diagram of various possible states of the local index 210 at the user computer 130 in accordance with some embodiments of the invention. To facilitate an incrementally updatable local index 210, the local index 210 may include a base index 420 and a delta index 440. The base index 420 differs from the delta index 440 in that the base index 420 does not need to be mutable at the user computer 130 while the delta index 340 may be mutated at the user computer 130. In other words, the base index 420 may be treated as immutable at the user computer 130 and only the delta index 440 and not the base index 420 is mutated at the user computer 130 with index mutations received from the index mutation server computer 114. Typically, the delta index 440 is much smaller in size in terms of bytes (e.g., an order of magnitude smaller) than the base index 420 allowing the delta index 440 to be entirely stored in volatile memory of the user computer 130 where it can be more efficiently mutated than the base index 420 would be, which is typically stored in non-volatile memory of the user computer 130 (e.g. on disk), although portions of the base index 420 (e.g., postings lists of the base index 420) may be cached in volatile memory of the user computer 130 from time to time.

In operation, the user computer 130 may initially not have a local index 210. A local index 210 may be created at the user computer 130 when a base index 420 is received from the online content management service 110. Thereafter, when changes to the user's 131 hosted content items 141 are made in the storage plane 140, the user computer 130 may receive index mutations from the online content management service 110 reflecting the changes to the user's 131 hosted content items 141. The delta index 440 may be mutated based on the received index mutations. Thus, at a given time, the local index 210 at the user computer 130 may contain just the base index 420 or both the base index 420 and the delta index 440. The base index 420 and the delta index 440 may be structured the same. That is, both base index 420 and the delta index 420 may be structured as an inverted index having a dictionary of index tokens and corresponding postings. When a query is received from the user 131, the local query processor at the user computer 130 may consult both the base index 420 and the delta index 440 with index entries in the delta index 440 overriding (superseding) corresponding entries in the base index 420.

A possible lifecycle of the local index 210 at the user computer 130 according to some embodiments of the present invention is illustrated in FIG. 4. Initially, at state 402A, the user computer 130 does not have a local index 210.

The user computer 130 may transition 404A-B from state 402A to 402B in response to receiving a first version of the base index 420 from the online content management service 110. The first version of the base index 420 reflects the state of the user's 131 hosted content items 141 up to a point in time.

At state 402B, the first version of the base index 420 is installed as part of the local index 210 at the user computer 130 and the local query processor at the user computer 130 uses the base index 420 to answer search queries received from the user 131.

The user computer 420 may transition 404B-C from state 402B to state 402C when an index mutation for a changed content item 141 is received from the index mutation server computer 114. At state 402C, the delta index 440 may be mutated to reflect the received index mutation. At state 402C, the local query processor at the user computer 130 uses both the base index 420 and the delta index 440 to process search queries from the user 131. In this case, index entries in the delta index 440 override (supersede) corresponding index entries in the base index 420. For example, the delta index 440 may indicate that a particular content item 141 matches a search query token because the particular content item 141 is identified in a postings list (e.g. 218A) of the delta index 440 associated with an index token (e.g. 214A) corresponding to the search query token. However, at the same time, the base index 420 may indicate that the particular content item 141 does not match the search query token. In this case, the conflict between the delta index 440 and the base index 420 is resolved in favor of the delta index 440 and the particular content item 141 is considered to match the search query token. The conflict is resolved in favor of the delta index 440 because the delta index 440 reflects the most recent changes to the user's 131 hosted content items 141 relative to the base index 420.

Also, as indicated by transition 404C-C, the delta index 440 at the user computer 130 may be further mutated when a new index mutation is received from the index mutation server computer 114.

The user computer 130 may transition 404C-B back to state 402B when a new base index 420 is received at the user computer 130 from the online content management service 110.

The user computer 130 may transition 404C-A from state 402C to state 402A or transition 404B-A from state 402B to state 402A on occurrence of various different events including, but not limited to, if the local index 210 is deleted or removed from the user computer 130.

In a typical operation, the cycle formed by transitions 404B-C and 404C-B may repeat continuously in which each time the user computer 130 transitions to state 402B a more up-to-date base index 420 received from the online content management service 110 is installed as part of the local index 210. The received base index 420 may be more up-to-date in the sense that it indexes changes to the user's 131 hosted content items 141 up to a point in time that is later (more recent) than a point in time up to which the current base index 420 at the user computer 130 indexes changes to the user's 131 hosted content items 141. Periodically replacing the current base index 420 at the user computer 130 with a more up-to-date base index 420 received from the online content management service 110 also has the effect of preventing the computer storage size of the delta index 440 in volatile memory of the user computer 130 from becoming too large. This effect is achieved because each time the current base index 420 is replaced with a more up-to-date base index 420, the entries in the current delta index 440 may be discarded. Thereafter, as new index mutations are received from the online content management service 110, entries are added to the delta index 440 based on the received index mutations until the next base index 420 is received, at which time the user computer transitions 404C-B back to state 402B.

The user computer's 130 local index timestamp may be updated at various different times including, but not limited to, when the user computer 130 transitions 404A-B from state 402A to state 402B, transitions 404B-C from state 402B to 402C, transitions 404C-B from state 402C to 402B, and transitions 404C-C from state 402C to 402C. Each time the local index timestamp is updated it may be updated to reflect the point-of-time up to which the local index 210 is up-to-date with respect to changes to the user's 131 hosted content items 141. This point-in-time may be determined in a variety of different ways including, but not limited to, a current date/time obtained from a system clock of the user computer 130 when new a base index or index mutation is received from the online content management service 110, a timestamp associated with a new base index 420 received from the online content management service 110, or a timestamp associated with a new index mutation received from the online content management service 110.

5.0 Basic Delta Index Mutation Operation

Figure 5A:
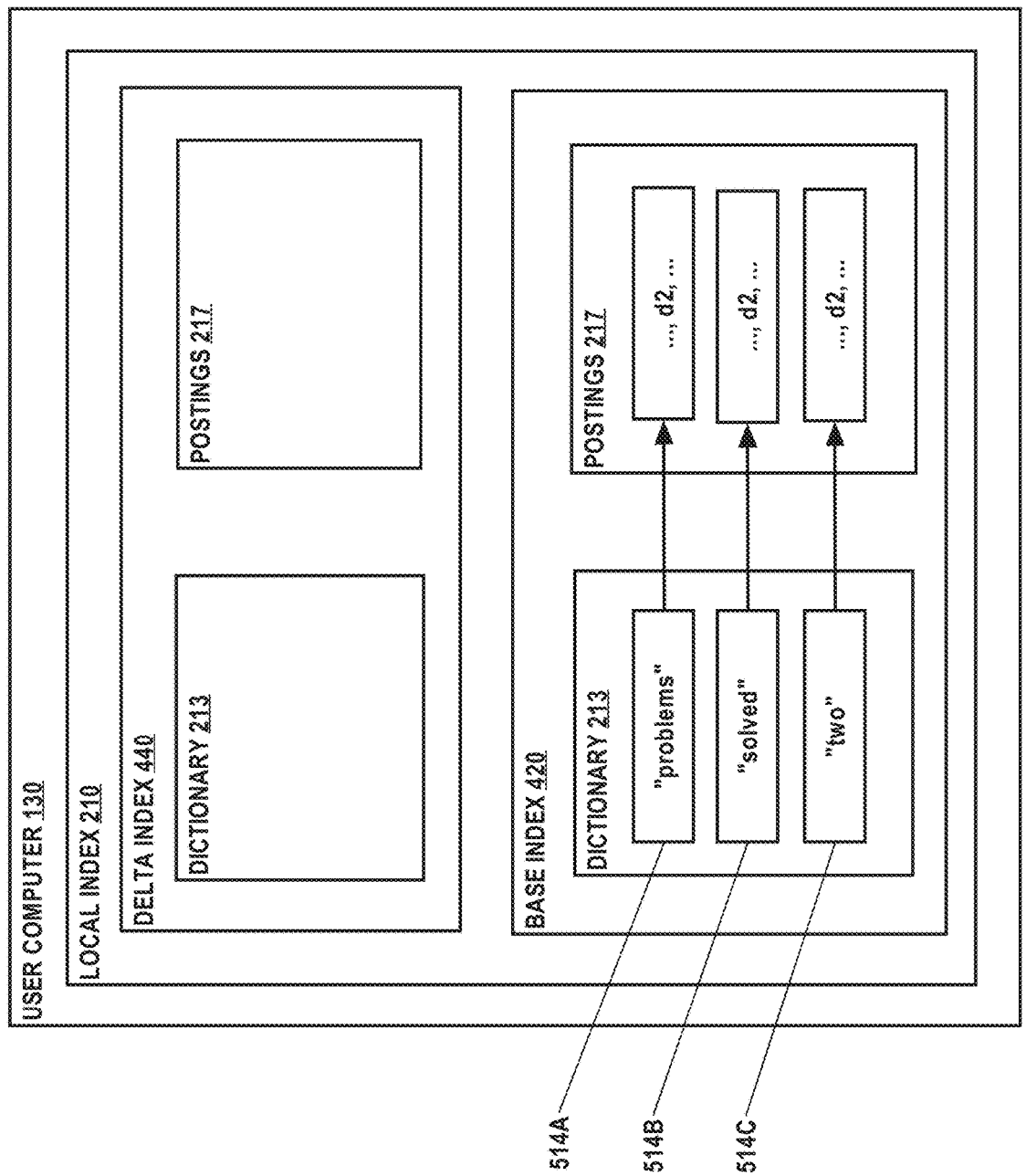
FIG. 5A is a schematic diagram of the local index at the user computer before an index mutation is applied to the local index in accordance with some embodiments of the invention.
Figure 5B:
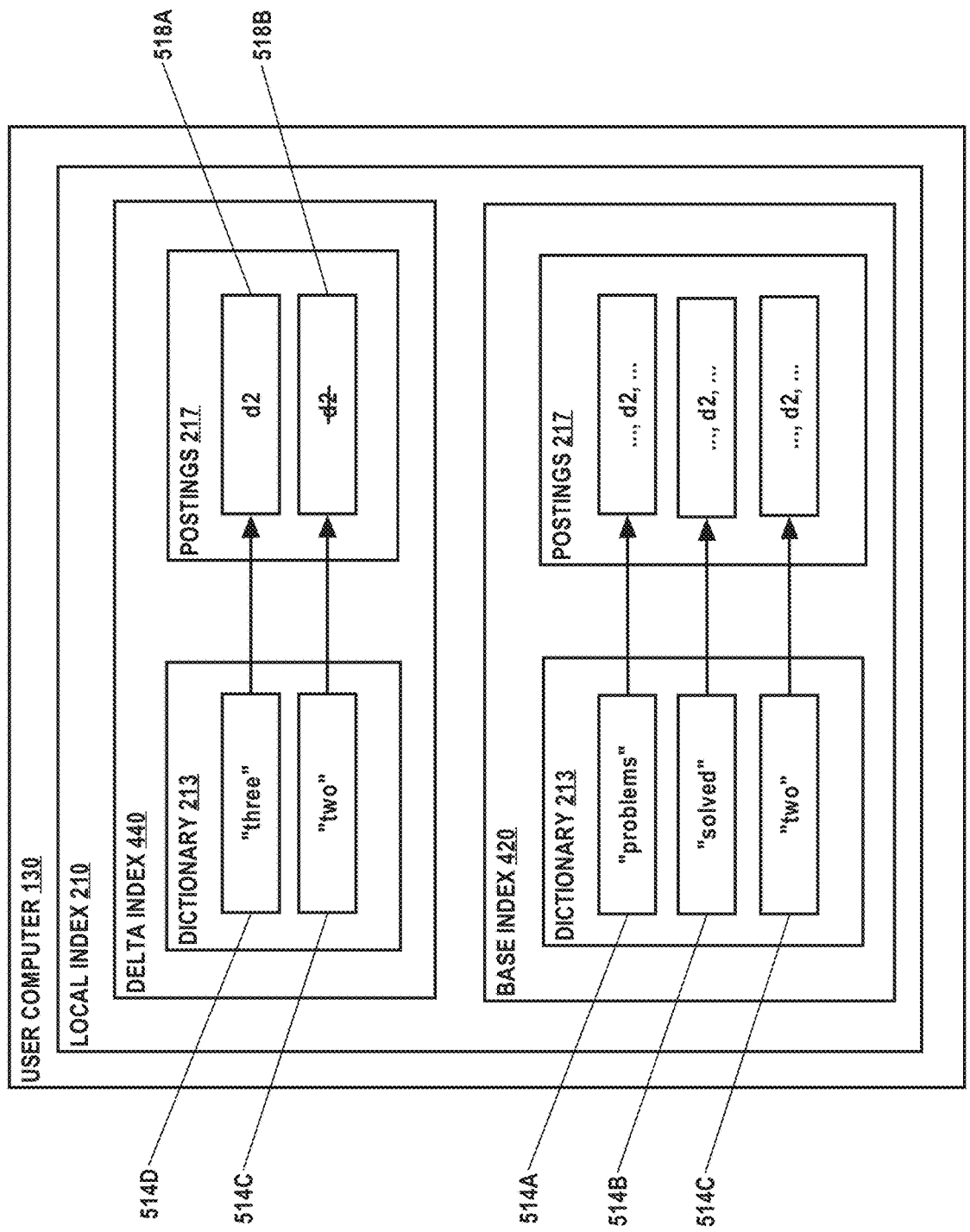
FIG. 5B is a schematic diagram of the local index at the user computer after the index mutation is applied to the local index in accordance with some embodiments of the invention.

Turning now to FIG. 5A and FIG. 5B, it is a schematic diagram of a basic index mutation operation applied to the local index 210 at the user computer 130 in accordance with some embodiments of the invention. FIG. 5A represents the local index 210 before the index mutation is applied and FIG. 5B represents the local index 210 after the index mutation is applied. The dictionary 213 may include index tokens and the postings 217 may include postings lists other than those shown in FIG. 5A and FIG. 5B.

In this example, assume the index mutation is for a content item 141 D2 and specifies to use the token "three" to index the content item 141 D2 and specifies not to use the token "two" to index the content item 141 D2.

Further assume that before the index mutation is applied to the local index 210, the content item 141 D2 is indexed in the base index 420 of the local index by the index tokens "solved" 514B, "two" 514C and "problems" 514A.

After the index mutation is applied to the local index 210, an index entry exists in the delta index 440 with the index token 514D "three" and a postings list 518A specifying the content item 141 D2. In addition, an index entry exists in the delta index 440 with the index token 513C "two" and postings list 518B specifying that the content item 141 D2 is no longer indexed by the index token 513C "two." Significantly, in this example, the base index 420 is not mutated when the index mutation is applied to the local index 210. Instead, the delta index 440 is mutated to represent changes to the user's 131 hosted content item 141 since the base index 420 was generated by the base index generator computer 111.

6.0 Index Mutation Journal

Figure 6:
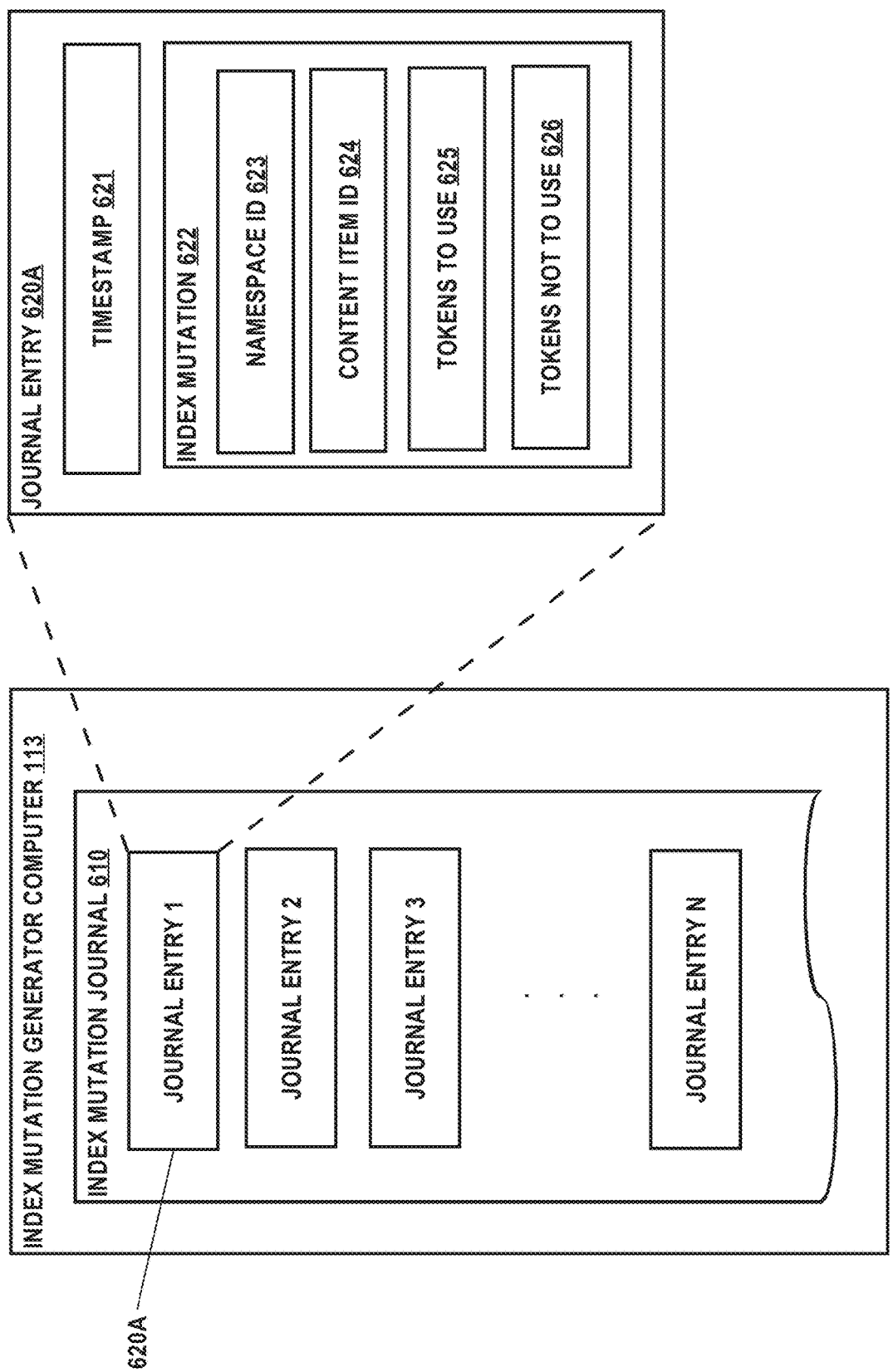
FIG. 6 is a schematic diagram of an index mutation journal at an index mutation generator computer of the online content management service according to some embodiments of the invention.

Turning now to FIG. 6, it is a schematic diagram of an index mutation journal 610 that may be maintained by the index mutation generator computer 113 according to some embodiments of the present invention. When a user's hosted content item 141 is changed, the index mutation generator computer 113 may be notified of the change. In response, the index mutation generator computer 113 generates an index mutation 622 reflecting the change and stores the index mutation 622 along with a journal timestamp 621 as part of a journal entry 620 in the index mutation journal 610.

In some embodiments, the index mutation journal 610 is implemented as an append-only distributed commit log built on commodity computing hardware. In this way, the index mutation generator computer 113 can process, and the index mutation journal 610 can store index mutations 622 for, a high rate of changes to content items 141 in the storage plane 140 (e.g., tens of thousands of changes per second). By implementing the journal 610 as an append-only distributed commit log using commodity computing hardware, the index mutation journal 610 can more effectively scale as the storage plane 140 stores more and more content items 141 and/or as rate of changes to content items 141 increase. In addition, storage device (e.g., disk) scanning is reduced by storing (appending) the next journal entry 620 at a location in computer storage that is contiguous to a location of the previous journal entry 620.

As shown, a journal entry 620 may include a journal timestamp 621 and an index mutation 622 generated for a changed content item 141 by the index mutation generator computer 113.

Turning first to the index mutation 622 generated for a changed content item 141, the index mutation 622 may include a content item namespace identifier 623, a content item identifier 624, a set 625 of one or more tokens to use to index the changed content item 141, and/or a set 626 of one or more tokens to not use to index the changed content item 141. The content item namespace identifier 623 identifies the content item namespace to which the changed content item 141 belongs.

An entry 620 in the journal 610 may include a journal timestamp 621 that can be compared to the local index timestamp for a user computer (e.g. 130) to determine whether the local index 210 at the user computer is up to date with respect to the index mutation 622.

7.0 Token Store

Figure 7:
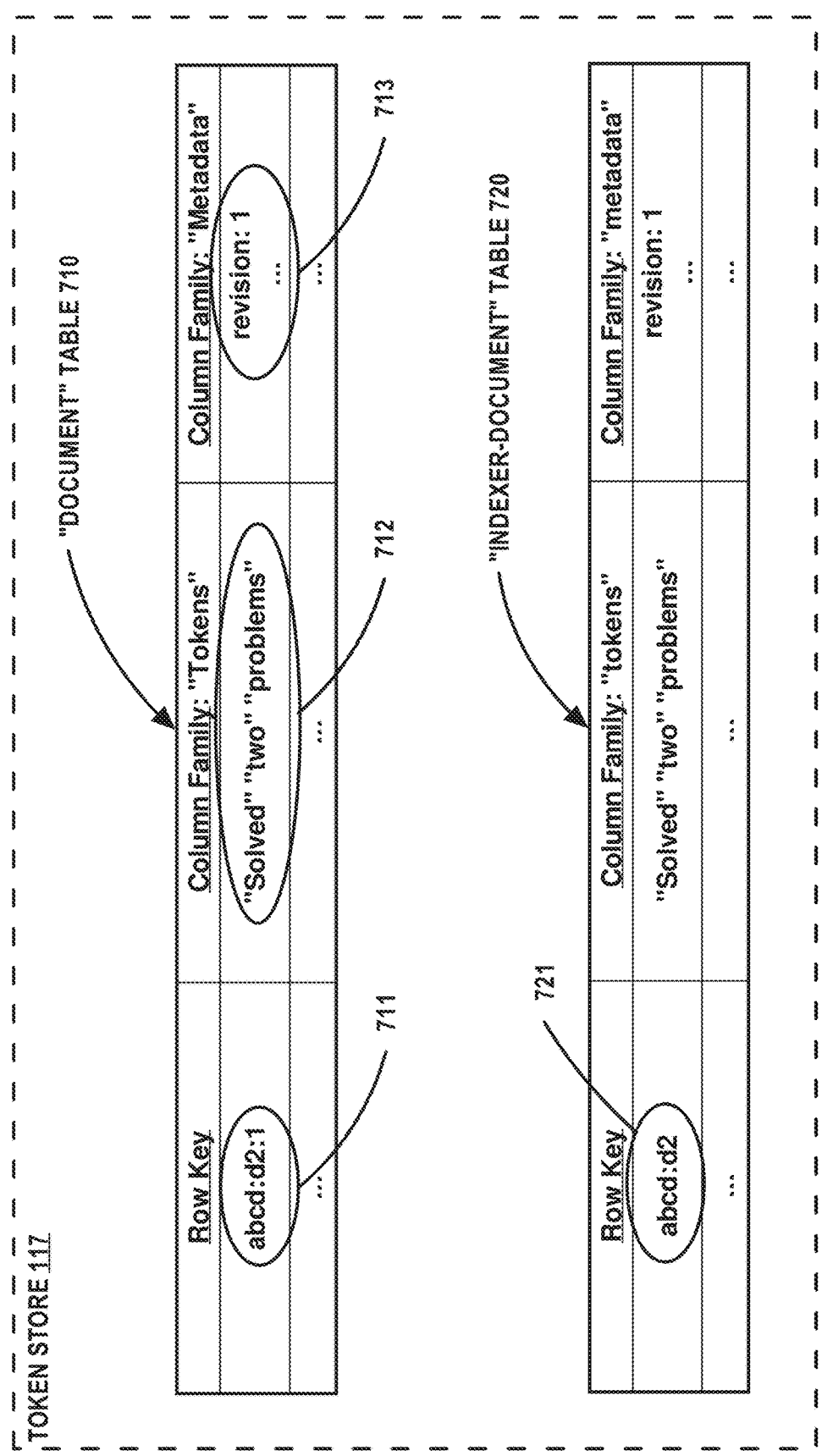
FIG. 7 is a schematic diagram of a possible schema for a token store of the online content management service in accordance with some embodiments of the present invention.

FIG. 7 illustrates a possible schema for token store 117, according to some embodiments of the invention. According to the schema, token store 117 includes two tables: "Document" table 710 and "Indexer-Document" table 720.

Document table 710 stores sets of tokens and metadata for versions of hosted content items 141 processed by tokenizer 118. In a practical embodiment, Document table 710, at a given time, may store information only for a number r of the most recent versions of a content item 141, where r may be selected based on various factors including, for example, a desired maximum size of Document table 710 or other factors according to the requirements of the particular implementation at hand. According to some embodiments, the base index generator computer 111 uses information in Document table 710 to generate base indexes 420.

Indexer-Document Table 720 stores sets of tokens and metadata for current versions of hosted content items 141 processed by the index mutation generator computer 113. In some embodiments, the current version of a content item 141 is the latest (most recent) version of the content item 141 that has been processed by index mutation generator computer 113. According to some embodiments, index mutation generator computer 113 uses information in Document table 710 and Indexer-Document table 720 to generate the index mutations that are stored in the index mutation journal 610.

Document table 710 includes a number of rows. A row in Document table 710 may be keyed by a row key (e.g., 711). A row key (e.g., 711) in some embodiments is a byte array including a content item namespace identifier, a content item identifier, and a content item version identifier. The content item identifier identifies a content item 141. The content item version identifier identifiers a particular version of the content item 141. Thus, a row in Document table 710 may correspond to a content item version. The content item namespace identifier identifies the content item namespace to which the content item 141 belongs. The colon character (':') or other character or character sequence may be used in the byte array to separate the content item namespace identifier, the content item identifier, and the content item version identifier from each other.

Document table 710 includes a "Tokens" column family. For each row in Document table 710, the Tokens column family stores a list of tokens (e.g., 712) produced by tokenizer computer 118 from the corresponding content item version. Although not shown in FIG. 7, the Tokens column family may also store various content item version-token attributes of a token. Such content item version-token attributes may include, for example, the frequency of the token and/or the position of the token in the corresponding content item version.

According to some embodiments of the present invention, some content item version-token attributes for a token for a corresponding content item 141 version that may be stored in the Document table 710 include the following, or a subset or a superset thereof:

A value indicating whether the corresponding token is part of the filename of the content item 141 version, A value indicating whether the corresponding token is part of the filename extension of the content item 141 version, A value indicating whether the corresponding token is part of the file path of the content item 141 version, A value indicating whether the corresponding token is part of the title of the content item 141 version, and/or A value indicating whether the corresponding token is bolded or otherwise highlighted in the text content of the content item 141 version.

In some embodiments, for a row in Document table 710, the Tokens column family stores a list of tokens (e.g., 712) and a list of content item version-token attributes. The list of tokens may be the same length as the list of content item version-token attributes. An element at position i in the list of content item version-token attributes includes content item version-token attributes for the token at position i in the list of tokens. Alternatively, a single list may be stored instead of two lists. Each element in the single list is a tuple including a token and content item version-token attributes of that token.

Document table 710 also includes a "Metadata" column family. For each row in Document table 710, the Metadata column family stores a set of named content item version attributes (e.g., 713) of the corresponding content item version. For example, in Document table 710, one of the content item version attributes, named "revision," is the content item version identifier of the corresponding document version. Other document version attributes are possible.

According to some embodiments of the present invention, some content item version attributes for a corresponding content item version that may be stored in the Document table 610 in addition to the content item version's "revision" include the following content item-version attributes, or a subset or a superset thereof:

The content item 141 version's size (e.g. in bytes),

A modification date/time of the content item 141 version,

A value indicating whether the content item 141 is deleted from the storage plane 140, A value indicating whether a content item corresponding to the content item 141 is stored at the user computer 130, If a content item corresponding to the content item 141 is stored at the user computer 130, a value indicating whether the version of the content item corresponding to content item 141 stored at the user computer 130 is out-of-date with respect to the content item 141 version, A value indicating the content item 141 version, A value indicating whether all available text content of the content item 141 version has been tokenized by the tokenizer 118, A value indicating whether the content item 141 is shared among more than one user of the online content management service 110 (e.g., associated with more than one user account of the online content management service 110), If the content item 141 is shared among more than one user of the online content management service 110, a list of user identifiers (and/or user account identifiers) of one or more users sharing the content item 141, A timestamp indicating a date/time the content item 141 version was stored in the storage plane 140, The number of tokens extracted from the content item 141 version by the tokenizer 118, A text summary/digest of the content item 141 version, and/or A text snippet from the content item 141 version.

The schema of Indexer-Document table 720 may be similar to Document table 710. In some embodiments, however, the row key (e.g., 721) of a row in Indexer-Document table 720 includes a content item namespace identifier and a content item identifier but not a content item version identifier. In these embodiments, each row in Indexer-Document table 720 may correspond to the latest (most recent) version of a content item processed by indexer 323 the index mutation generator computer 113.

In the example of FIG. 7, example row keys 711 and 721 are provided. For purposes of providing clear examples, the example row keys 711 and 721 comprise a content item namespace identifier of "abcd" and a content item identifier of "d2." In some embodiments, however, a content item namespace identifier is a 64-bit fixed-length value that uniquely identifies a content item namespace and a content item identifier is a 64-bit fixed length value that uniquely identifies a content item 141 in the storage plane 140.

In some embodiments, a content item version identifier uniquely identifies a version of a content item 141 and provides an ordering of the version with respect to other versions of the content item 141. For example, content item version identifiers for three versions of a content item 141 may be the values "1," "2," and "3," respectively, with the version "3" corresponding to the most recent version of the content item 141 and the version "1" corresponding to an earlier version of the content item 141.

8.0 Process for Indexing Hosted Content Items at a User Computer

Figure 8:
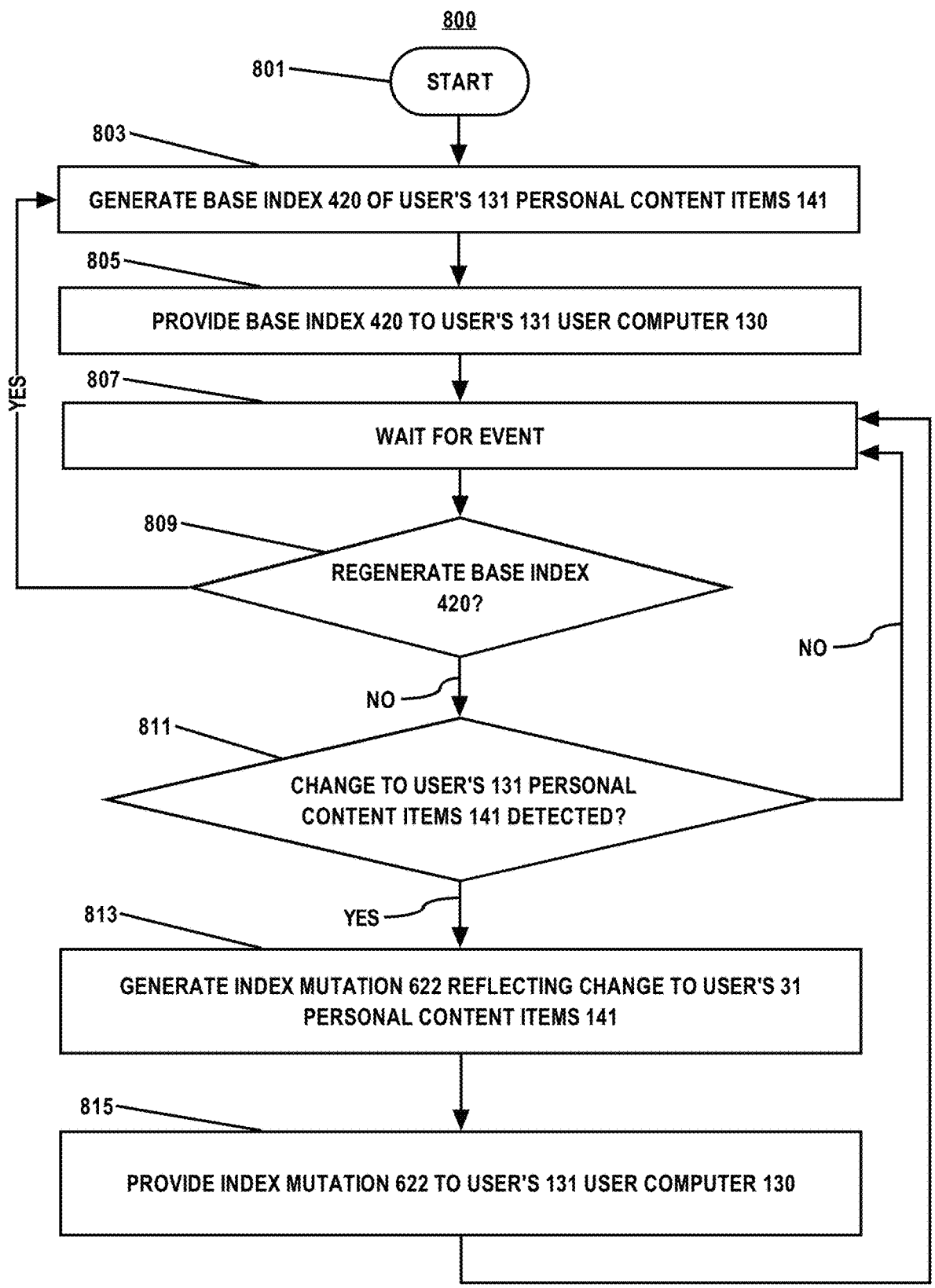
FIG. 8 is a flowchart of a process for indexing the user's hosted content items at the user computer according to some embodiments of the invention.

Turning now to FIG. 8, it is a flowchart of a process 800 for indexing at the user computer 130 the user's 131 content items 141 hosted with the online content management service 110. The process 800 may be performed by one or more computers, such as, for example, one or more of the base index generator computer 111, the base index server computer 112, the index mutation generator computer 113, the index mutation server computer 114, the back-end search query processor computer 115, the front-end search query processor computer 116, the tokenizer computer 118, and/or the user computer 130.

The process 800 begins at step 801 where it is assumed that the user 131 has a number of content items 141 stored in the storage plane 140 and associated a user account that the user 131 holds with the online content management service 110.

At step 803, a base index 420 of the user's 131 hosted content items 141 is generated by the online content management service 110.

At step 805, the generated base index 420 is provided by the online content management service 110 to the user computer 130. At this point, the user computer 130 may install the base index 420 as part of a local index 210 of the user computer 130 and the local index 210 may be used by a local query processor at the user computer 130 to process user 131 search queries.

At step 807, the online content management service 110 waits for an occurrence of an event. There are two different types of events that are of particular interest, among other possible events that may occur.

Occurrence of a first type of event means that the time has come to generate a new, more up-to-date, base index 420 of the user's 131 hosted content items 141. On occurrence of the first type of event, the process 800 proceeds from step 809 to step 803.

On the other hand, occurrence of a second type of event means that a change to one or more of the user's 131 hosted content items 141 has been detected. On occurrence of the second type of event, the process 800 proceeds from step 811 to step 813.

The first type of event indicating that the time has come to generate a new, more up-to-date, base index 420 of the user's 131 hosted content items 141 may occur at step 807 for a variety of different reasons including, but not limited to:

because a base index regeneration timer has expired,
because a threshold number of changes to the user's 131 content items 141 have been made since the last base index 420 of the user's 131 content items 141 was generated, and/or
because a threshold change rate of changes to the user's 131 content items 141 has been exceeded.

At step 813, if occurrence of the second type of event indicating that one or more changes to the user's 131 hosted content items 141 has been detected, then the online content management service 110 generates an index mutation 622 for each detected change and stores the generated index mutations 622 in the index mutation journal 610 in association with corresponding journal timestamps 610.

At step 815, the online content management service 110 provides generated index mutations 622 from the index mutation journal 610 over the communications network 120 to the user computer 130. To identify index mutations 622 in journal 610 to provide to the user computer 130, the online content management service 110 may use a local index timestamp for the user computer 130 and one or more content item namespace identifiers associated with the user computer 130. Based on the local index timestamp for the user computer 130 and the one or more content item namespace identifiers, the online content management system 110 can identify index mutations 622 in the journal 610 to provide to the user computer 130 that (1) have a journal timestamp 610 that is more recent than the local index timestamp for the user computer 130, and (2) have a content item namespace identifier 623 that matches of the one or more content item namespace identifiers associated with the user computer 130. The local index timestamp associated with the user computer 130 reflects a point in time up to which the local index 210 at the user computer 130 is up to date with respect to changes to the user's 131 hosted content items 141 in the storage plane 140. The one or more content item namespace identifiers associated with the user computer 130 each identify a content item namespaces to which the user's 131 hosted content items 141 belong.

The process 800 enables the user 131 to use the user computer 130 to search the user's 131 hosted content items 141 by performing searches of the user's 131 hosted content items 141 and changes thereto at the user computer 130 using the local index 210 at the user computer 130 constructed based on the base index 420 and the index mutations 622 received by the user computer 130. An advantage provided by process 800 is that the user 131 can search the user's 131 hosted content items 141 and changes thereto even if the user computer 130 is not connected to the online content management service 110 at the time of the search. Another advantage of process 800 is that an answer to the user's 131 search query can be provided to the user 131 more quickly or in offline networking environments because the local index 210 allows the answer to be identified and provided to the user 131 without having to send the search query over the communications network 120.

8.0 Process for Searching for Hosted Content Items at a User Computer

Figure 9:
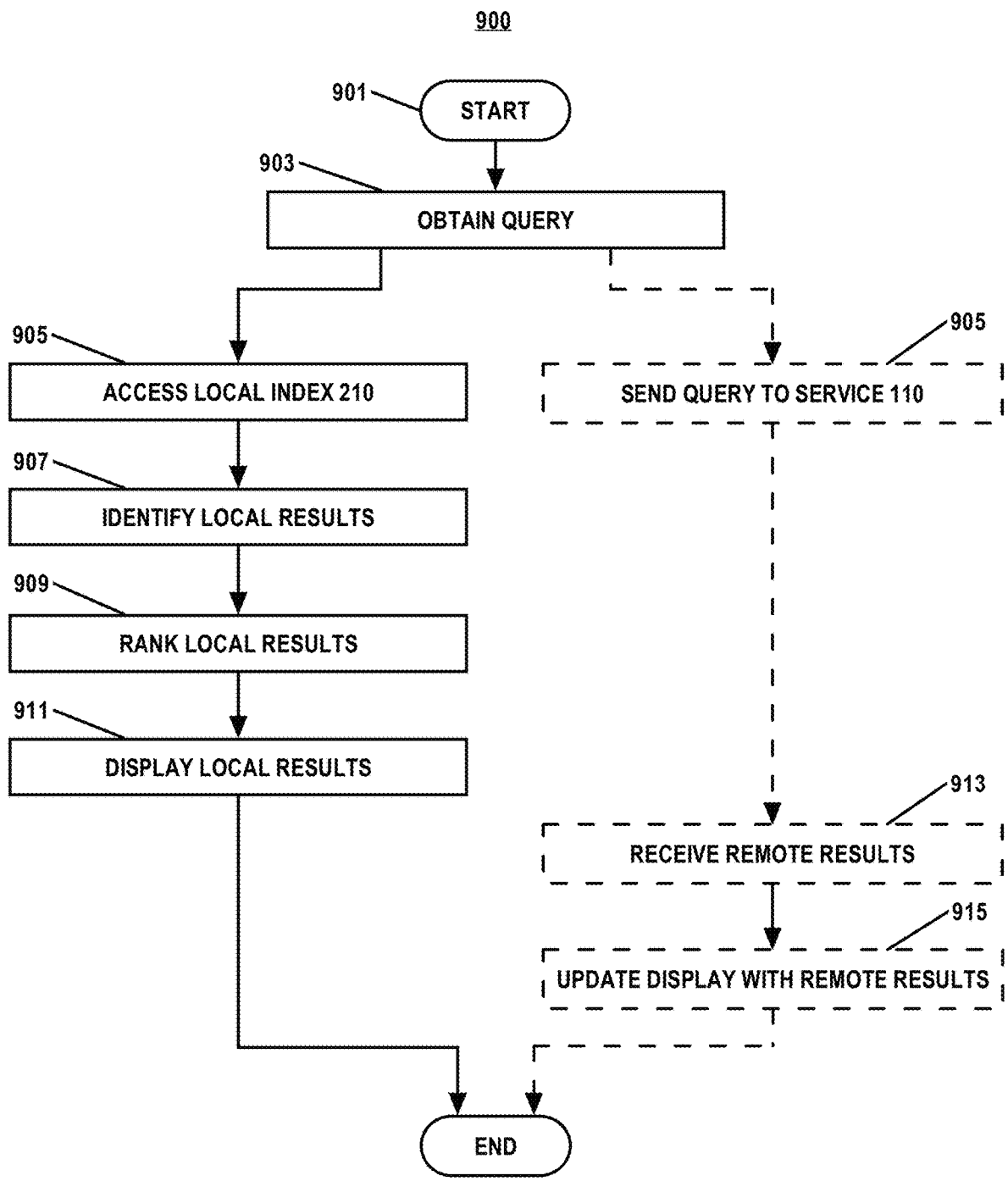
FIG. 9 is a flowchart of a process for searching the user's hosted content items at the user computer according to some embodiments of the present invention.

Turning now to FIG. 9, it is a flowchart of a process 900 for searching the user's 131 hosted content items 141 at the user computer 130 according to some embodiments of the present invention. In this example, the process 900 is performed by the user computer 130.

The process starts at step 901. At step 901, the user computer 130 may or may not be communicatively to the communications network 120. In other words, the user computer 130 may be offline (e.g., not communicatively coupled to the communications network 120 or online (e.g., communicatively coupled to the communications network 120).

At step 903, the user computer 130 receives a search query from the user 131. For example, the user 131 may enter a search expression into a graphical user interface presented at the user computer 130 using a user input mechanism such as, for example, a physical keyboard or a touch sensitive surface (e.g., a touch screen display). The user computer 130 may receive the search query from the user 131 in response to the user 131 activating a graphical user interface element, such as, for example, a "Submit," "Send," or "Search" button.

At step 905, the user computer 130 accesses the local index 210 with the received search query. Optionally, if the user computer 130 is online, then the user computer 130 at step 902 may also send the search query to the online content management service 110 over the communications network 120. For example, the user computer 130 may send the search query over the communications network 120 to the front-end query processor computer 116. The search query may be sent in a search request according to a networking protocol, such as, for example, the HyperText Transfer Protocol (HTTP) or the Secure HyperText Transfer Protocol (HTTPS).

At step 907, the user computer 130 identifies in the local index 210 one or more local results that satisfy the search query. Each such local result corresponds to one of the user's 131 hosted content items 141, which may or may not be stored at the user computer 130, or if stored at the user computer 130, may be a version of the content item 141 that is older than the latest version of the content item 141 stored in the storage plane 140. Each such local result may be scored for relevance according to a query independent or query dependent ranking function.

At step 909, the local query processor at the user computer 130 ranks the one or more local results identified in the local index 210 according to their relevance scores.

At step 911, the user computer 130 displays one or more the ranked local results in a graphical user interface presented at the user computer 131. Each displayed local result may be displayed as a search answer summary.

If the search query was sent to the online content management service 110 at step 905, then at step 913 the user computer 130 receives one or more remote results to the search query from the online content management service 110. In many cases, because of the network latency over the communications network 120, the user computer 130 will be able to display local results at step 911 before or while receiving remote results at step 913. Each remote result received at step 913 corresponds to one of the user's 131 hosted content items 141. Each such remote result may be scored for relevance according to a query independent or query dependent ranking function. Further, the remote results may be received at step 913 ranked in order of their relevance scores as computed by the online content management service 110. The ranking function used by the online content management service 110 to score remote results may be the same as the ranking function used by the user computer 130 to score local results. In this way, a relevance score computed by the online content management service 110 for a remote result is comparable to a relevance score computed by the user computer 130 for a local result.

At step 915, the user computer 130 updates the graphical user interface to display one or more remote results received at step 913 that have better (e.g., higher) relevance scores than the worst (e.g., lowest) scoring currently displayed local result, if there are any such remote results corresponding to a content item 141 that does not corresponding to a currently displayed local result.

The process 900 enables the user 131 to use the user computer 130 to search the user's 131 hosted content items 141 by performing searches of the user's 131 hosted content items 141 and changes thereto at the user computer 130 using the local index. An advantage provided by process 900 is that the user 131 can search the user's 131 hosted content items 141 and changes thereto even if the user computer 130 is not online. Another advantage of process 900 is that, if the user computer 130 is online, an answer to the user's 131 search query can be provided to the user 131 quickly because the local index 210 allows a preliminary answer to be identified and provided to the user 131 without having to send the search query over the communications network 120. Soon thereafter, display of the preliminary answer can be updated with display of remote results as they are received from the online content management service 110 to provide a more comprehensive and more up-to-date answer to the search query.

10.0 Basic Computer Hardware

The present invention may be implemented on one or more computers, such as, for example, on one or more of the base index generator computer 111, the base index server computer 112, the index mutation generator computer 113, the index mutation server computer 114, the back-end search query processor computer 115, the front-end search query processor computer 116, the tokenizer computer 118, and/or the user computer 130. Such a computer may be implemented in various forms including, but not limited to, a client computer, a server computer, a network device, a mobile device, a cell phone, a smart phone, a laptop computer, a desktop computer, a workstation computer, a personal digital assistant, a blade server computer, a mainframe computer, and other types of computers.

The computer components described below, including their connections, relationships, and functions, are meant to be exemplary only, and are not meant to limit implementations of the present invention. Other computers suitable for implementing the present invention may have different components, including components with different connections, relationships, and functions.

Figure 10:
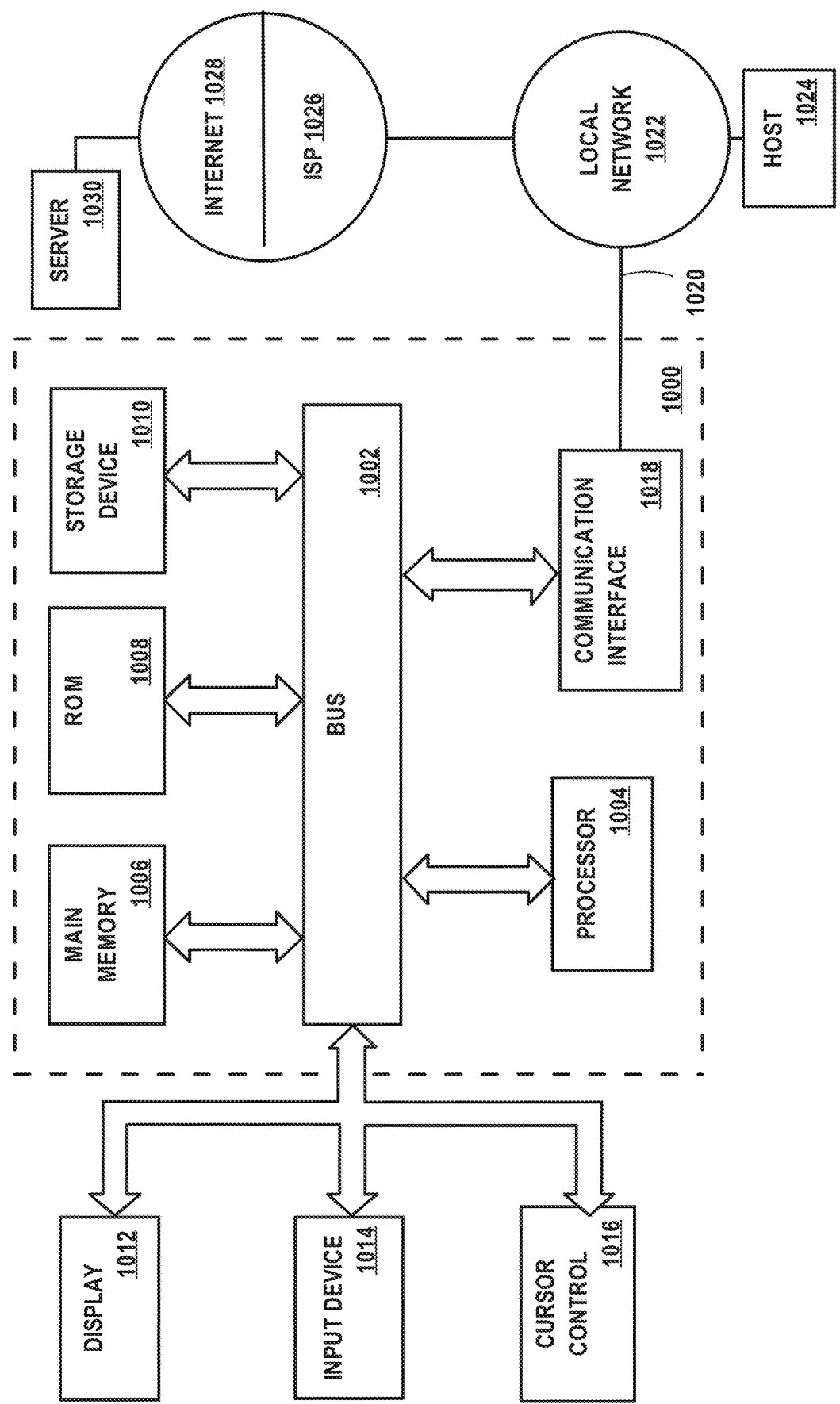
FIG. 10 is a schematic of basic computer components that may be used to implement some embodiments of the invention.

Turning now to FIG. 10, it is a block diagram of a basic computer 1000 suitable for implementing various embodiments of the invention. Computer 1000 includes hardware bus 1002 or other communication mechanism for addressing main memory 1006 and for transferring data between and among the various components of computer 1000. Computer 1000 also includes hardware processor 1004 coupled with bus 1002 for processing information. Hardware processor 1004 may be a general purpose microprocessor, a system on a chip (SoC), or other processor suitable for implementing the described technologies.

Main memory 1006, such as a random access memory (RAM) or other dynamic storage device, is coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computing device 1000 into a special-purpose computing device that is customized to perform the operations specified in the instructions.

Computer 1000 further includes read only memory (ROM) 1008 or other static storage device coupled to bus 1002 for storing static information and instructions for processor 1004.

Mass storage device 1010 is coupled to bus 1002 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, mass storage devices 1010 (e.g., the main hard disk for the device) stores a body of program and data for directing operation of the computing device, including an operating system, user application programs, driver and other support files, as well as other data files of all sorts.

Computer 1000 may be coupled via bus 1002 to display 1012, such as a liquid crystal display (LCD) or other electronic visual display, for displaying information to a computer user. Display 1012 may also be a touch-sensitive display for communicating touch gesture (e.g., finger or stylus) input to processor 1004.

An input device 1014, including alphanumeric and other keys, is coupled to bus 1002 for communicating information and command selections to processor 1004.

Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer 1000 may implement the methods described herein using customized hard-wired logic, one or more application-specific integrated circuits (ASICs), one or more field-programmable gate arrays (FPGAs), firmware, or program logic which, in combination with the computing device, causes or programs computer 1000 to be a special-purpose machine.

Methods disclosed herein may also be performed by computer 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer 1000 also includes communication interface 1018 coupled to bus 1002. Communication interface 1018 provides a two-way data communication coupling to wired or wireless network link 1020 that is connected to local network 1022 (e.g., Ethernet network, Wireless Local Area Network, cellular phone network, Bluetooth wireless network, or the like). Communication interface 1018 sends and receives electrical, electromagnetic, or optical signals that carry digital data streams representing various types of information. For example, communication interface 1018 may be a wired network interface card, a wireless network interface card with an integrated radio antenna, or a modem (e.g., ISDN, DSL, or cable modem).

Network link 1020 typically provide data communication through one or more networks to other data devices. For example, network link 1020 may provide a connection through local network 1022 to host computer 1024 or to data equipment operated by Internet Service Provider (ISP) 1026. ISP 1026 in turn provides data communication services through the world wide packet data communication network now commonly referred to as the "Internet" 1028. Local network 1022 and Internet 1028 use electrical, electromagnetic or optical signals that carry digital data streams. The signals through the various networks and the signals on network link 1020 and through communication interface 1018, which carry the digital data to and from computer 1000, are example forms of transmission media.

Computer 1000 can send messages and receive data, including program code, through local network 1022, Internet 1028, ISP 1026, network link 1020 and communication interface(s) 1018. In the Internet example, server computer 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

11.0 Basic Software System

Figure 11:
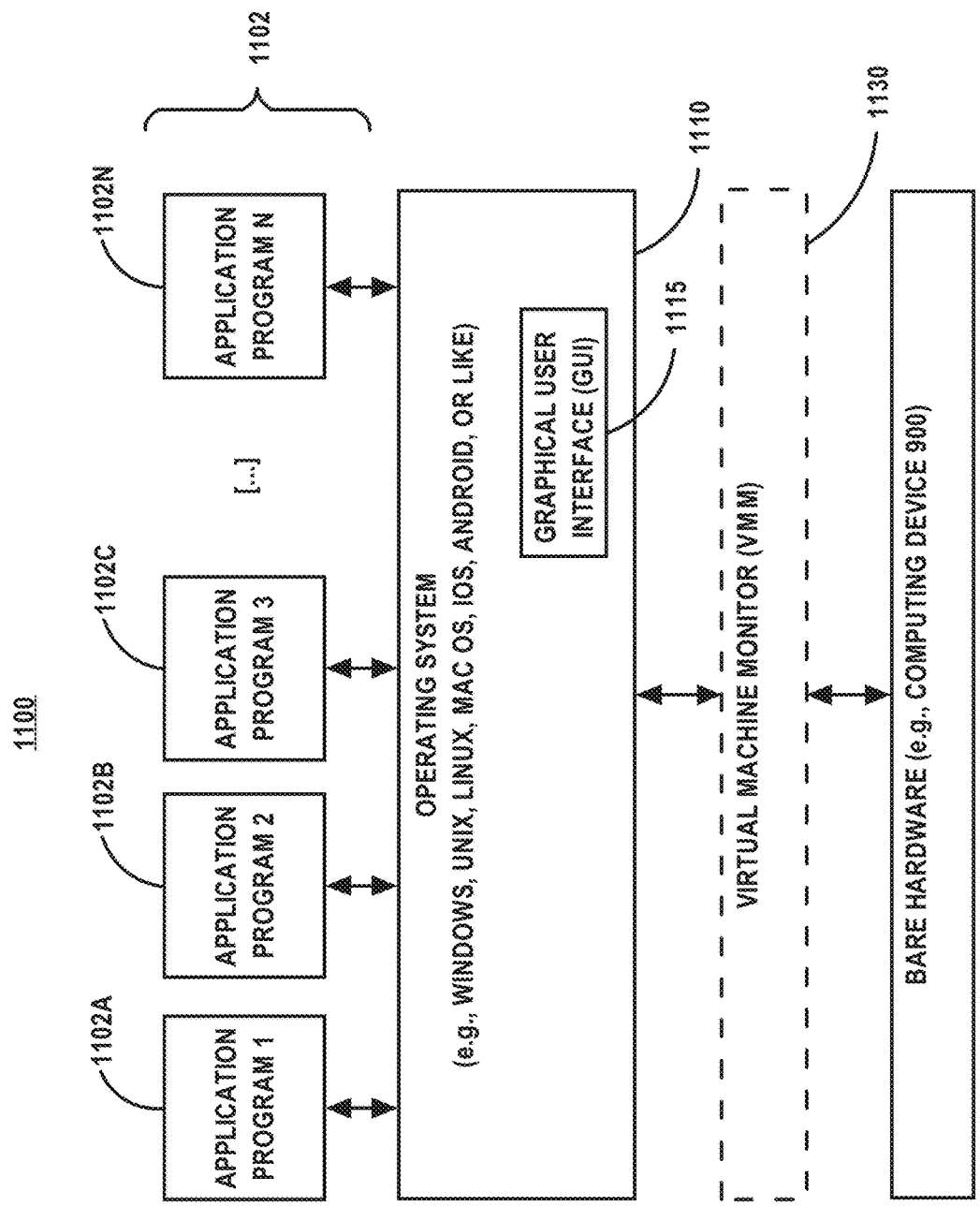
FIG. 11 is a schematic of a basic software system that may be used for controlling the operation of the basic computer of FIG. 10.

Turning now to FIG. 11, it is a block diagram of a basic software system 1100 for controlling the operation of computer 1000 in accordance with some embodiments of the invention. As shown, computer software system 1100 is provided for directing the operation of computing device 1000. Software system 1100, which is stored in system memory (RAM) 1006 and on fixed storage (e.g., hard disk) 1010, includes kernel or operating system (OS) 1110. OS 1110 manages low-level aspects of computer operation, including managing execution of processes, memory allocation, file input and output (I/O), and device I/O. One or more application programs 1102 (e.g., 1102A, 1102B, 1102C . . . 1102N) may be "loaded" (e.g., transferred from fixed storage 1010 into memory 1006) for execution by system 1100. In some instances, application programs 1102 or other software intended for use on device 1000 may also be stored as a set of downloadable computer-executable instructions, for example, for downloading and installation from an Internet location (e.g., from a web server).

Software system 1100 may include graphical user interface (GUI) 1115, for receiving user commands and data in a graphical (e.g., "point-and-click" or "touch gesture") fashion. These inputs, in turn, may be acted upon by system 1100 in accordance with instructions from operating system 1110 and/or application programs 1102. GUI 1115 also serves to display the results of operation from OS 1110 and application programs 1102, whereupon the user may supply additional inputs or terminate the session (e.g., log off).

OS 1110 can execute directly on the hardware (e.g., processor 1004) of computer 1000. Alternatively, hypervisor or virtual machine monitor (VMM) 1130 may be interposed between the hardware and OS 1110. In this configuration, VMM 1130 acts as a software "cushion" or virtualization layer between OS 1110 and the hardware of computer 1000.

VMM 1130, if present, instantiates and runs virtual machine instances ("guest machines"). Each guest machine includes a "guest" operating system, such as OS 1110, and one or more application programs, such as application programs 1102, designed to execute on the guest operating system. VMM 1130 presents the guest operating systems with a virtual operating platform and manages the execution of the guest operating systems. In some instances, VMM 1130 may allow a guest operating system to run as through it is running on the hardware of computer 1000 directly. In these instances, the same version of the guest operating system configured to execute on the hardware directly may also be able to execute on VMM 1130 without modification or reconfiguration. In other words, VMM 1130 may provide full hardware and CPU virtualization to a guest operating system in some instances. In other instances, a guest operating system may be specially designed or configured to execute on VMM 1130 for efficiency. In these instances, the guest operating system is "aware" that it executes on a virtual machine monitor 1130. In other words, VMM 1130 may provide para-virtualization to a guest operating system in some instances.

The above-described computer hardware and software are presented for purpose of illustrating basic underlying computer components that may be employed for implementing various embodiments of the present invention. The present invention, however, is not limited to any particular computing environment or computer configuration. Instead, an embodiment of the present invention may be implemented in any type of system architecture or processing environment capable of supporting the embodiment as disclosed herein.

Although the foregoing describes the invention with example embodiments, this is not intended to limit the invention. Indeed, the foregoing is intended to cover all modifications and alternative constructions failing within the spirit and scope of the invention.

The invention claimed is:

1. A method performed by a computing system comprising one or more processors and storage media storing one or more programs, the one or more programs comprising instructions executed by the one or more processors to perform the method, the method comprising:
    determining a first set of content items hosted with an online content management service that a particular user account of the online content management service is authorized to access, wherein the online content management service hosts a plurality of sets of content items for a plurality of user accounts of the online content management service;
    generating a first base inverted index comprising a first set of index tokens that index the first set of content items;
    sending the first base inverted index to a user computer associated with the particular user account;
    detecting a change to a particular content item of the first set of content items;
    identifying a set of one or more token differences between: (a) a version of the particular content item resulting from the change and (b) a prior version of the particular content item;
    based on the particular user account being authorized to access the particular content item, sending the set of one or more token differences to the user computer associated with the particular user account to cause the user computer to index the particular content item in a delta inverted index of the first base inverted index at the user computer;
    based on detecting an event:
        determining a second set of content items hosted with the online content management service that the particular user account is authorized to access,
        generating a second base inverted index comprising a second set of index tokens for indexing the second set of content items, and
        sending the second base inverted index to the user computer to cause the user computer to replace the first base inverted index and the delta inverted index at the user computer with the second base inverted index.

2. The method of claim 1, further comprising, after the sending the first base inverted index and prior to the sending the set of one or more token differences to the user computer:
    determining a change timestamp reflecting a time of the change to the particular content item;
    comparing the change timestamp to an index timestamp reflecting a time when the first base inverted index was generated; and
    wherein the sending the set of one or more token differences to the user computer is based on a result of the comparing indicating that the first based inverted index was generated before the change to the particular content item.

3. The method of claim 1, wherein the event detected is expiration of an index regeneration timer.

4. The method of claim 1, wherein the event detected is a threshold number of changes to content items associated with a user account.

5. The method of claim 1, wherein the event detected is a threshold rate of change of changes to content items associated with a user account.

6. The method of claim 1, wherein the first set of content items belong to a particular content item namespace of the online content management service that the particular user account is authorized to access; and wherein the determining the first set of content items hosted with the online content management service that the particular user account of the online content management service is authorized to access is based on using an identifier of the particular content item namespace to identify the first set of content items that belong to the particular content item namespace.

7. The method of claim 6, wherein the second set of content items belong to the particular content item namespace; and wherein the determining the second set of content items hosted with the online content management service that the particular user account of the online content management service is authorized to access is based on using the identifier of the particular content item namespace to identify the second set of content items that belong to the particular content item namespace.

8. The method of claim 1, wherein the set of one or more token differences comprises one or more tokens in (a) the version of the particular content item resulting from the change but not in (b) the prior version of the particular content item.

9. The method of claim 1, wherein the set of one or more token differences comprises one or more tokens in (b) the prior version of the particular content item but not in (a) the version of the particular content item resulting from the change.

10. The method of claim 1, wherein the set of one or more token differences comprises:
a first set of one or more tokens in (a) the version of the particular content item resulting from the change but not in (b) the prior version of the particular content item, and
a second set of one or more tokens in (b) the prior version of the particular content item but not in (a) the version of the particular content item resulting from the change.

11. The method of claim 1, further comprising:
receiving a request for updates from the user computer; and
sending the set of token differences to the user computer in response to receiving the request.

12. A non-transitory computer-readable medium storing one or more programs, the one or more programs comprising instructions which, when executed by one or more processors, cause the one or more processors to perform:
determining a first set of content items hosted with an online content management service that a particular user account of the online content management service is authorized to access, wherein the online content management service hosts a plurality of sets of content items for a plurality of user accounts of the online content management service;
generating a first base inverted index comprising a first set of index tokens that index the first set of content items;
sending the first base inverted index to a user computer associated with the particular user account;
detecting a change to a particular content item of the first set of content items;
identifying a set of one or more token differences between: (a) a version of the particular content item resulting from the change and (b) a prior version of the particular content item;
based on the particular user account being authorized to access the particular content item using the online content management service, sending the set of one or more token differences to the user computer associated with the particular user account to cause the user computer to index the particular content item in a delta inverted index of the first base inverted index at the user computer;
based on detecting an event:
determining a second set of content items hosted with the online content management service that the particular user account is authorized to access,
generating a second base inverted index comprising a second set of index tokens for indexing the second set of content items, and
sending the second base inverted index to the user computer to cause the user computer to replace the first base inverted index and the delta inverted index at the user computer with the second base inverted index.

13. The non-transitory computer-readable medium of claim 12, wherein the instructions, when executed by the one or more processors, further cause the one or more processors to perform:
after the sending the first base inverted index and prior to the sending the set of one or more token differences to the user computer:
determining a change timestamp reflecting a time of the change to the particular content item;
comparing the change timestamp to an index timestamp reflecting a time when the first base inverted index was generated; and
wherein the sending the set of one or more token differences to the user computer is based on a result of the comparing indicating that the first based inverted index was generated before the change to the particular content item.

14. The non-transitory computer-readable medium of claim 12, wherein the event detected is expiration of an index regeneration timer.

15. The non-transitory computer-readable medium of claim 12, wherein the event detected is a threshold number of changes to content items associated with a user account.

16. The non-transitory computer-readable medium of claim 12, wherein the event detected is a threshold rate of change of changes to content items associated with a user account.

17. A computing system comprising
one or more hardware processors;
storage media;
one or more programs stored in the storage media for execution by the one or more hardware processors, the one or more programs comprising instructions configured for:
determining a first set of content items hosted with an online content management service that a particular user account of the online content management service is authorized to access, wherein the online content management service hosts a plurality of sets of content items for a plurality of user accounts of the online content management service;
generating a first base inverted index comprising a first set of index tokens that index the first set of content items;
sending the first base inverted index to a user computer associated with the particular user account;
detecting a change to a particular content item of the first set of content items;
identifying a set of one or more token differences between: (a) a version of the particular content item resulting from the change and (b) a prior version of the particular content item;
based on the particular user account being authorized to access the particular content item, sending the set of one or more token differences to the user computer associated with the particular user account to cause the user computer to index the particular content item in a delta inverted index of the first base inverted index at the user computer;
based on detecting an event:
determining a second set of content items hosted with the online content management service that the particular user account is authorized to access,
generating a second base inverted index comprising a second set of index tokens for indexing the second set of content items, and
sending the second base inverted index to the user computer to cause the user computer to replace the first base inverted index and the delta inverted index at the user computer with the second base inverted index.

18. The computing system of claim 17, wherein the one or more programs further comprise instructions configured for, after the sending the first base inverted index and prior to the sending the set of one or more token differences to the user computer:

determining a change timestamp reflecting a time of the change to the particular content item;

comparing the change timestamp to an index timestamp reflecting a time when the first base inverted index was generated; and wherein the sending the set of one or more token differences to the user computer is based on a result of the comparing indicating that the first based inverted index was generated before the change to the particular content item.

19. The computing system of claim 18, wherein the event detected is a threshold number of changes to content items associated with a user account.

20. The computing system of claim 18, wherein the event detected is a threshold rate of change of changes to content items associated with a user account.

* * * * *